United States Patent
Uchiyama

(10) Patent No.: US 12,395,894 B2
(45) Date of Patent: Aug. 19, 2025

(54) INFORMATION PROCESSING DEVICE, INFORMATION PROCESSING METHOD, TERMINAL DEVICE, BASE STATION DEVICE, AND PROGRAM

(71) Applicant: Sony Group Corporation, Tokyo (JP)

(72) Inventor: Hiromasa Uchiyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 404 days.

(21) Appl. No.: 17/782,174

(22) PCT Filed: Oct. 30, 2020

(86) PCT No.: PCT/JP2020/040845
§ 371 (c)(1),
(2) Date: Jun. 3, 2022

(87) PCT Pub. No.: WO2021/117373
PCT Pub. Date: Jun. 17, 2021

(65) Prior Publication Data
US 2023/0046442 A1    Feb. 16, 2023

(30) Foreign Application Priority Data
Dec. 13, 2019  (JP) ................................ 2019-225917

(51) Int. Cl.
*H04W 28/18* (2009.01)
*H04B 7/06* (2006.01)
(Continued)

(52) U.S. Cl.
CPC .......... *H04W 28/18* (2013.01); *H04B 7/0617* (2013.01); *H04L 41/12* (2013.01); *H04W 4/40* (2018.02); *H04W 24/10* (2013.01)

(58) Field of Classification Search
None
See application file for complete search history.

(56) References Cited

U.S. PATENT DOCUMENTS

| 2018/0213549 A1* | 7/2018 | Kim | ...................... H04L 5/0032 |
| 2018/0241810 A1* | 8/2018 | Lerzer | .................... H04L 67/10 |

(Continued)

FOREIGN PATENT DOCUMENTS

| CN | 108292368 A | 7/2018 |
| EP | 4027680 A1 | 7/2022 |

(Continued)

OTHER PUBLICATIONS

International Search Report and Written Opinion mailed on Dec. 15, 2020, received for PCT Application PCT/JP2020/040845, Filed on Oct. 30, 2020, 9 pages including English Translation.

*Primary Examiner* — Gregory B Sefcheck
(74) *Attorney, Agent, or Firm* — XSENSUS LLP

(57) ABSTRACT

An information processing device includes an acquisition unit that acquires information related to a communication environment, and a determination unit that determines a mode to be used on the basis of the information related to the communication environment among a first mode of determining a communication parameter on the basis of a measurement result using a reference signal, a second mode of determining the communication parameter on the basis of a learning result of machine learning using known information related to communication, and a third mode of determining the communication parameter according to the first mode and/or the second mode.

19 Claims, 33 Drawing Sheets

(51) Int. Cl.
  *H04L 41/12*  (2022.01)
  *H04W 4/40*  (2018.01)
  *H04W 24/10*  (2009.01)

(56) References Cited

U.S. PATENT DOCUMENTS

| | | | |
|---|---|---|---|
| 2018/0262834 A1* | 9/2018 | Cho | G06F 3/16 |
| 2018/0262918 A1 | 9/2018 | Zhao | |
| 2018/0376357 A1* | 12/2018 | Tavares Coutinho | H04W 64/003 |
| 2019/0190747 A1* | 6/2019 | Park | H04W 72/046 |
| 2019/0304309 A1* | 10/2019 | Sakamoto | B60W 30/16 |
| 2019/0310633 A1* | 10/2019 | Toyoda | B60W 50/085 |
| 2019/0342763 A1 | 11/2019 | Jung | |
| 2020/0007247 A1* | 1/2020 | Gulati | H04B 17/373 |
| 2020/0015272 A1* | 1/2020 | Lee | H04W 72/23 |
| 2020/0017124 A1* | 1/2020 | Camhi | B60W 60/0053 |
| 2020/0239029 A1* | 7/2020 | Kim | G06V 20/56 |
| 2020/0314803 A1* | 10/2020 | Zhang | H04W 74/006 |
| 2020/0367030 A1* | 11/2020 | Baek | H04W 80/02 |
| 2021/0031807 A1* | 2/2021 | Yamamoto | B60W 60/0057 |
| 2021/0070296 A1* | 3/2021 | Ruppel | H04W 52/0261 |
| 2021/0127364 A1* | 4/2021 | Panteleev | H04L 1/1819 |
| 2021/0144517 A1* | 5/2021 | Guim Bernat | H04L 9/3247 |
| 2021/0160922 A1* | 5/2021 | Luo | H04L 5/0053 |
| 2021/0258988 A1* | 8/2021 | Balakrishnan | G06N 3/08 |
| 2021/0297128 A1* | 9/2021 | Badic | G01S 5/0284 |
| 2021/0321446 A1* | 10/2021 | Lee | H04W 72/0446 |
| 2022/0053498 A1* | 2/2022 | Wang | H04W 72/02 |
| 2022/0069879 A1* | 3/2022 | Wernersson | H04B 7/0658 |
| 2022/0086713 A1* | 3/2022 | Määttänen | H04W 36/00837 |
| 2022/0109546 A1* | 4/2022 | Panteleev | H04L 5/0053 |
| 2022/0116089 A1* | 4/2022 | Khoryaev | H04B 7/043 |
| 2022/0182850 A1* | 6/2022 | Ramachandra | H04W 16/28 |
| 2022/0295295 A1* | 9/2022 | Moosavi | H04W 24/08 |
| 2022/0295330 A1* | 9/2022 | Ji | H04W 4/40 |
| 2022/0393781 A1* | 12/2022 | Kim | H04W 8/02 |
| 2023/0046442 A1* | 2/2023 | Uchiyama | H04W 4/40 |
| 2023/0362725 A1* | 11/2023 | Condoluci | H04W 4/70 |

FOREIGN PATENT DOCUMENTS

| | | |
|---|---|---|
| JP | 2011-49931 A | 3/2011 |
| JP | 2013-51520 A | 3/2013 |
| JP | 2014-222939 A | 11/2014 |
| JP | 2019-140582 A | 8/2019 |
| KR | 20190104275 A | 9/2019 |
| WO | WO-2019112499 A1 | 6/2019 |
| WO | WO-2019187423 A1 | 10/2019 |
| WO | WO-2019210953 A1 | 11/2019 |
| WO | WO-2019211134 A1 | 11/2019 |

\* cited by examiner

FIG.19

| INFORMATION CATEGORY | EXAMPLE |
|---|---|
| INFORMATION RELATED TO TERMINAL | · TERMINAL POSITION INFORMATION, AREA INFORMATION<br>· TERMINAL MOVING SPEED<br>· TERMINAL TRAVELING DIRECTION<br>· TERMINAL Capability<br>→TERMINAL CATEGORY<br>→MIMO SUPPORT, NUMBER OF ANTENNA<br>: |
| INFORMATION RELATED TO BASE STATION | · BASE STATION Capability<br>→ML SUPPORT AVAILABILITY<br>→MIMO SUPPORT, NUMBER OF ANTENNA<br>: |
| INFORMATION RELATED TO USED BAND | · LICENSE<br>· UN-LICENSE<br>· ITS BAND<br>· BANDWIDTH<br>· BAND CONGESTION DEGREE, CBR(Channel Busy Ratio)<br>· CR(Channel Occupancy Ratio)<br>· BAND INTERFERENCE LEVEL (SUCH AS SINR, SIR, OR CIR)<br>· AMOUNT OF AVAILABLE RESOURCE<br>: |
| OTHER | · 3D MAP, DYNAMIC MAP INFORMATION<br>· OVERHEAD RATE<br>· KIND OF TRANSMISSION PACKET, PACKET PRIORITY<br>· AMOUNT OF REMAINING TERMINAL BATTERY<br>· VEHICLE BODY INFORMATION OF TERMINAL<br>→SUCH AS SIZE, WEIGHT, AND RADIO WAVE REFLECTION RATE<br>: |

FIG.20

| AREA #1 87% | AREA #2 80% | AREA #3 65% |
|---|---|---|
| AREA #4 92% | AREA #5 81% | AREA #6 55% |
| AREA #7 82% | AREA #8 52% | AREA #9 33% |

FIG.23

| Measurement BASIS |
|---|

| WIRELESS COMMUNICATION PARAMETER | CONTROL EXAMPLE |
|---|---|
| TRANSMISSION POWER | MEASURE RSRP/RSRQ AND CONTROL TRANSMISSION POWER BY USING TPC command |
| TRANSMISSION TIMING | MEASURE PUSCH/PRACH AND CONTROL TRANSMISSION TIMING BY USING TA command |
| MCS CONTROL, RESOURCE ALLOCATION, etc. | MEASURE WIRELESS LINK STATE BY USING REFERENCE SIGNAL AND PERFORM MCS CONTROL AND ALLOCATION OF RESOURCE |
| MIMO CONTROL | MEASURE CSI (PMI, RI, OR CQI) BY USING REFERENCE SIGNAL AND DETERMINE WEIGHT |
| HANDOVER | MEASURE RRM AND CONTROL HANDOVER |
| ⋮ | ⋮ |

| REFERENCE SIGNAL, KNOWN SIGNAL, etc. |
|---|
| · Demodulation Reference Signal (DMRS)<br>· Phase Tracking Reference Signal (PTRS)<br>· Sounding Reference Signal (SRS)<br>· Channel State Information Reference Signal (CSI-RS)<br>· Cell Specific Reference Signal (CRS)<br>· Positioning Reference Signal (PRS)<br>· Primary Synchronization Signal (PSS)<br>· Secondary Synchronization Signal (SSS)<br>· MBSFN Reference Signal (MBSFN-RS)<br>⋮ |

FIG.25

| INFORMATION CATEGORY | EXAMPLE |
|---|---|
| INFORMATION RELATED TO TERMINAL | ・TERMINAL POSITION<br>・SPEED<br>・TRAVELING DIRECTION<br>・TERMINAL CATEGORY<br>・ANTENNA INFORMATION (SUCH AS INSTALLATION POSITION, NUMBER, AND CONFIGURATION)<br>⋮ |
| INFORMATION RELATED TO BASE STATION | ・INSTALLATION POSITION<br>・HEIGHT<br>・ANTENNA INFORMATION (SUCH AS INSTALLATION POSITION, NUMBER, AND CONFIGURATION)<br>⋮ |
| INFORMATION RELATED TO ENVIRONMENT | ・3D MAP INFORMATION (INCLUDING SURROUNDING OBSTACLE INFORMATION)<br>・MATERIAL INFORMATION OF SURROUNDING OBSTACLE<br>・SURROUNDING VEHICLE INFORMATION<br>→SUCH AS TERMINAL POSITION, SPEED, TRAVELING DIRECTION, TERMINAL CATEGORY, AND ANTENNA INFORMATION (SUCH AS INSTALLATION POSITION, NUMBER, AND CONFIGURATION)<br>・WEATHER INFORMATION<br>→SUCH AS GOOD WEATHER, RAIN, FOG, TEMPERATURE, OR HUMIDITY<br>⋮ |
| INFORMATION RELATED TO COMMUNICATION | ・TRANSMISSION POWER<br>・MCS<br>・INFORMATION RELATED TO PRECODING<br>→SUCH AS PMI, RI, OR CQI<br>・CONNECTION DESTINATION BASE STATION<br>・ALLOCATION TIME FREQUENCY RESOURCE<br>・RESOURCE POOL INFORMATION<br>・ZONE NUMBER (TERMINAL POSITION INFORMATION IN COMMUNICATION)<br>・RSRP, RSRQ, RSSI, THROUGHPUT, BLER, PER, SNR, SIR, SINR, SLR (Signal to Leakage Ratio)<br>⋮ |
| ⋮ | ⋮ |

| EXAMPLE OF SET WIRELESS COMMUNICATION PARAMETER | |
|---|---|
| TRANSMISSION POWER | ·TPC command |
| TRANSMISSION TIMING | ·TA command |
| MCS CONTROL, RESOURCE ALLOCATION | ·MCS<br>·ALLOCATION TIME FREQUENCY RESOURCE |
| MIMO CONTROL | ·MIMO PRECODING<br>→PMI, RI, Beam ID |
| HANDOVER | ·HO PERFORMANCE DETERMINATION<br>·HO DESTINATION |
| ⋮ | ⋮ |

FIG.36

```
For i=1:N_u do:
    Run bit-map model to predict BSM
End for
For i=1:N_u do:
    G(i) ← index of Max(mean(BSM[:, I, :]))        // Assign gNB
End for
For i=1:N_u do:
    For j=1:N_u except i do:
        SLR[j,:] ← BSM[G(i),i,:] / BSM[G(i),j,:]    //Leakage from UE i to j
    End for
    B(i) ← index of Max( min_{j=1:N_u,j≠i} SLR[j,:])   //Assign beam
End for
```

INFORMATION PROCESSING DEVICE, INFORMATION PROCESSING METHOD, TERMINAL DEVICE, BASE STATION DEVICE, AND PROGRAM

CROSS-REFERENCE TO RELATED APPLICATIONS

The present application is based on PCT filing PCT/JP2020/040845, filed Oct. 30, 2020, which claims priority to Japanese Patent Application No. 2019-225917, filed Dec. 13, 2019, the entire contents of each are incorporated herein by reference.

FIELD

The present disclosure relates to an information processing device, an information processing method, a terminal device, a base station device, and a program.

BACKGROUND

Conventionally, in wireless communication, a technology of improving communication quality by using a smart antenna technology such as multiple-input and multiple-output (MIMO) communication has been known. In addition, by utilization of such a technology, expectation for communication for automobiles, so-called vehicle-to-everything (V2X) communication, is increased, for example, in order to realize autonomous driving of the automobiles.

Note that a surrounding situation changes at any time since the automobile moves. Thus, a technology of enabling selection of a communication parameter according to a changing surrounding situation has also been proposed.

CITATION LIST

Patent Literature

Patent Literature 1: Japanese Patent Application Laid-open No. 2013-051520

SUMMARY

Technical Problem

However, in wireless communication, it is very important to reduce overhead in order to improve performance such as a throughput of a system. For example, in multi-antenna communication such as MIMO communication, the overhead of a reference signal, control information, and the like used for channel estimation or the like increases in proportion to the number of antennas. In addition, in recent years, a standardization of massive MIMO communication that performs large-capacity communication using a large number of antennas has been started, and there is a concern about further increase in overhead.

Thus, the present disclosure proposes an information processing device, an information processing method, a terminal device, a base station device, and a program capable of realizing a reduction of the overhead in the wireless communication.

Solution to Problem

In order to solve the above problems, one aspect of an information processing device according to the present disclosure includes an acquisition unit that acquires information related to a communication environment, and a determination unit that determines a mode to be used on the basis of the information related to the communication environment among a first mode of determining a communication parameter on the basis of a measurement result using a reference signal, a second mode of determining the communication parameter on the basis of a learning result of machine learning using known information related to communication, and a third mode of determining the communication parameter according to the first mode and/or the second mode.

BRIEF DESCRIPTION OF DRAWINGS

FIG. 19 is a view illustrating an example of information necessary for mode determination.

FIG. 20 is a view illustrating an example of a map including a beamforming selection probability.

FIG. 23 is a view illustrating a control example on a Measurement basis.

FIG. 25 is a view illustrating an example of information collected for machine learning on the ML basis.

FIG. 36 is a view illustrating an example of an algorithm of machine learning using the BSM.

DESCRIPTION OF EMBODIMENTS

Figure 1:
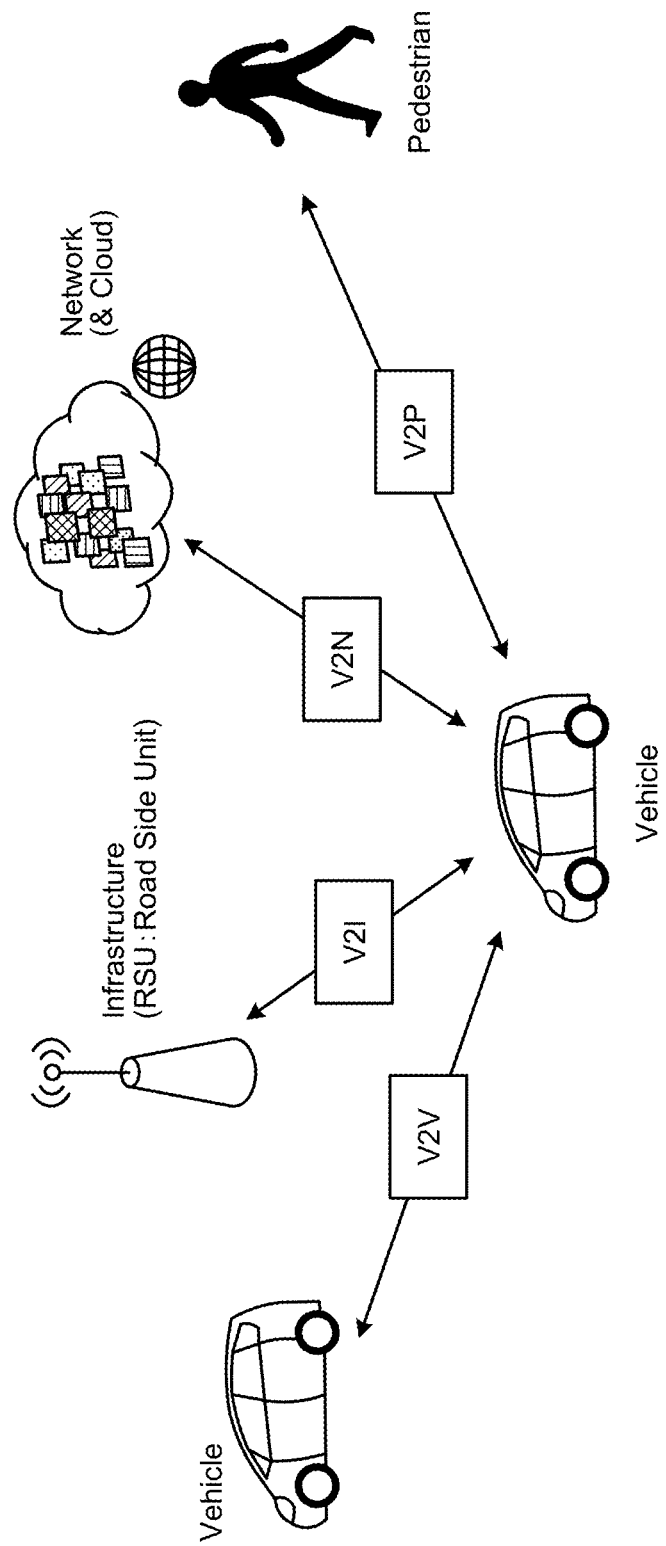
FIG. 1 is a view for describing V2X communication.

In the following, embodiments of the present disclosure will be described in detail on the basis of the drawings. Note that in each of the following embodiments, overlapped description is omitted by assignment of the same reference sign to identical parts.

In addition, in the present description and the drawings, a plurality of components having substantially the same functional configuration may be distinguished by assignment of different numbers after the same reference sign. For example, a plurality of configurations having substantially the same functional configuration is distinguished as base station devices 201 and 202 as necessary. However, in a case where it is not specifically necessary to distinguish the plurality of components having substantially the same functional configuration from each other, only the same reference sign is assigned. For example, in a case of not being specifically necessary to be distinguished from each other, the base station devices 201 and 202 are simply referred to as a base station device 20.

Also, the present disclosure will be described in the following order of items.

1. Introduction
   1-1. V2X communication overview
   1-2. V2X use case
   1-3. V2X operation scenario
   1-4. Outline of present embodiment
   1-5. Operation scenario of present embodiment
2. Configuration of information processing system
   2-1. Overall configuration of information processing system
   2-2. Configuration of management device
   2-3. Configuration of base station device (network)
   2-4. Configuration of base station device (infrastructure)
   2-5. Configuration of terminal device
3. Operation of information processing system
   3-1. Execution subject of mode switching processing
   3-2. Case where terminal device is execution subject of mode switching processing
   3-3. Case where base station device is execution subject of mode switching processing
   3-4. Collection of information necessary for mode determination
   3-5. Execution condition and the like of mode switching processing
   3-6. Mode determination notification between base station and terminal
   3-7. Operation in each mode
   3-8. Change in setting of terminal-side setting information according to determined mode
   3-9. Verification of communication result
4. Example
   4-1. First example
   4-2. Second example
5. Modification example
   5-1. Modification example related to machine learning
   5-2. Other modification examples
6. Conclusion

1. INTRODUCTION

Conventionally, a mobile communication system is to provide a communication function for a mobile terminal such as a cellular phone or a smartphone. However, in recent years, it becomes more important for the mobile communication system to support communication for a mobile body of a type different from a mobile terminal, such as an automobile, drone, or robot.

For example, in recent years, the mobile communication system is required to support V2X communication as communication for automobiles. Examples of the communication for automobiles include road-to-vehicle communication realized by an intelligent transportation system (ITS) or the like, and vehicle-to-vehicle communication realized by sidelink communication or the like. These communication technologies may become important technologies for realizing future autonomous driving.

Here, the V2X communication is communication between a vehicle and "something". FIG. 1 is a view for describing the V2X communication. Here, examples of "something" include a vehicle, infrastructure, network, pedestrian, and the like. Communication between vehicles is called vehicle-to-vehicle (V2V) communication. Also, communication between the vehicle and the infrastructure is called vehicle-to-infrastructure (V2I) communication. Also, communication between the vehicle and the network is called vehicle-to-network (V2N) communication. Also, communication between the vehicle and the pedestrian is called vehicle-to-pedestrian (V2P) communication.

1-1. V2X Communication Overview

Figure 2:
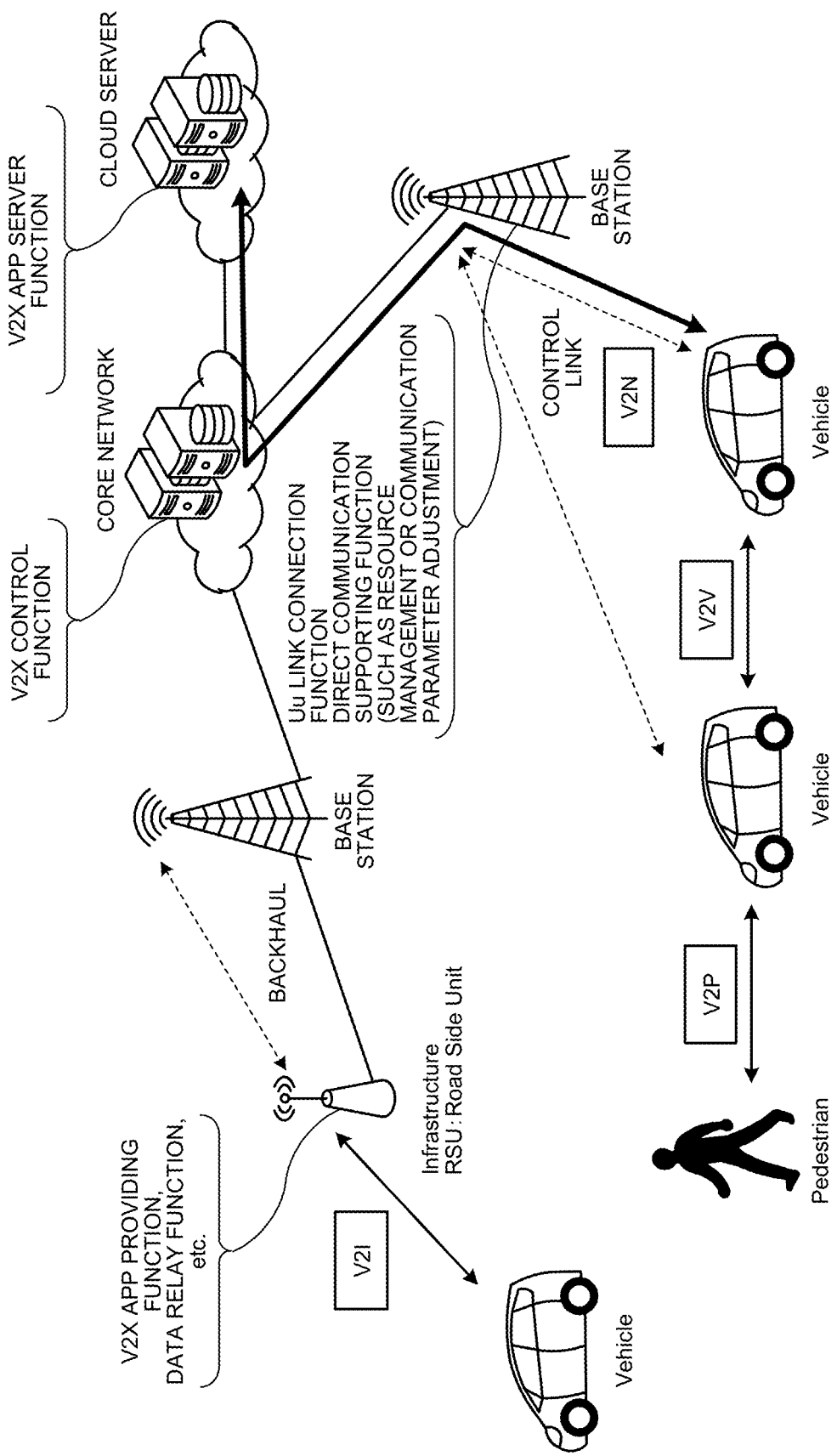
FIG. 2 is a view illustrating an example of an overview of the V2X communication.

FIG. 2 is a view illustrating an example of an overview of the V2X communication. In the example of FIG. 2, a cloud server has an application server (APP server) function of V2X. The cloud server is connected to a core network via a network such as the Internet. The core network includes a device having a control function of the V2X communication. A plurality of base stations is connected to the core network. Each of the base stations has a function of performing wireless communication with a terminal device (vehicle in the example of FIG. 2) (such as Uu link connection function using Uu interface). In addition, the base station has a function of supporting direct communication such as V2V communication or V2P communication (such as sidelink communication). Note that a road side unit (RSU) is arranged as an infrastructure on a road. As the RSU, two RSUs that are a base station-type RSU and a user equipment (UE)-type RSU are conceivable. The RSU includes, for example, a V2X APP providing function, data relay function, and the like.

1-2. V2X Use Case

As the wireless communication for automobiles, development of 802.11p-based dedicated short range communication (DSRC) has been mainly advanced in the past. However, in recent years, "LTE-based V2X" that is long term evolution (LTE)-based in-vehicle communication has been standardized. In the LTE-based V2X communication, an exchange of basic safety messages and the like is supported. In recent years, with an aim of further improvement of the V2X communication, NR V2X communication using a 5G technology (new radio (NR)) has been studied.

Figure 3:
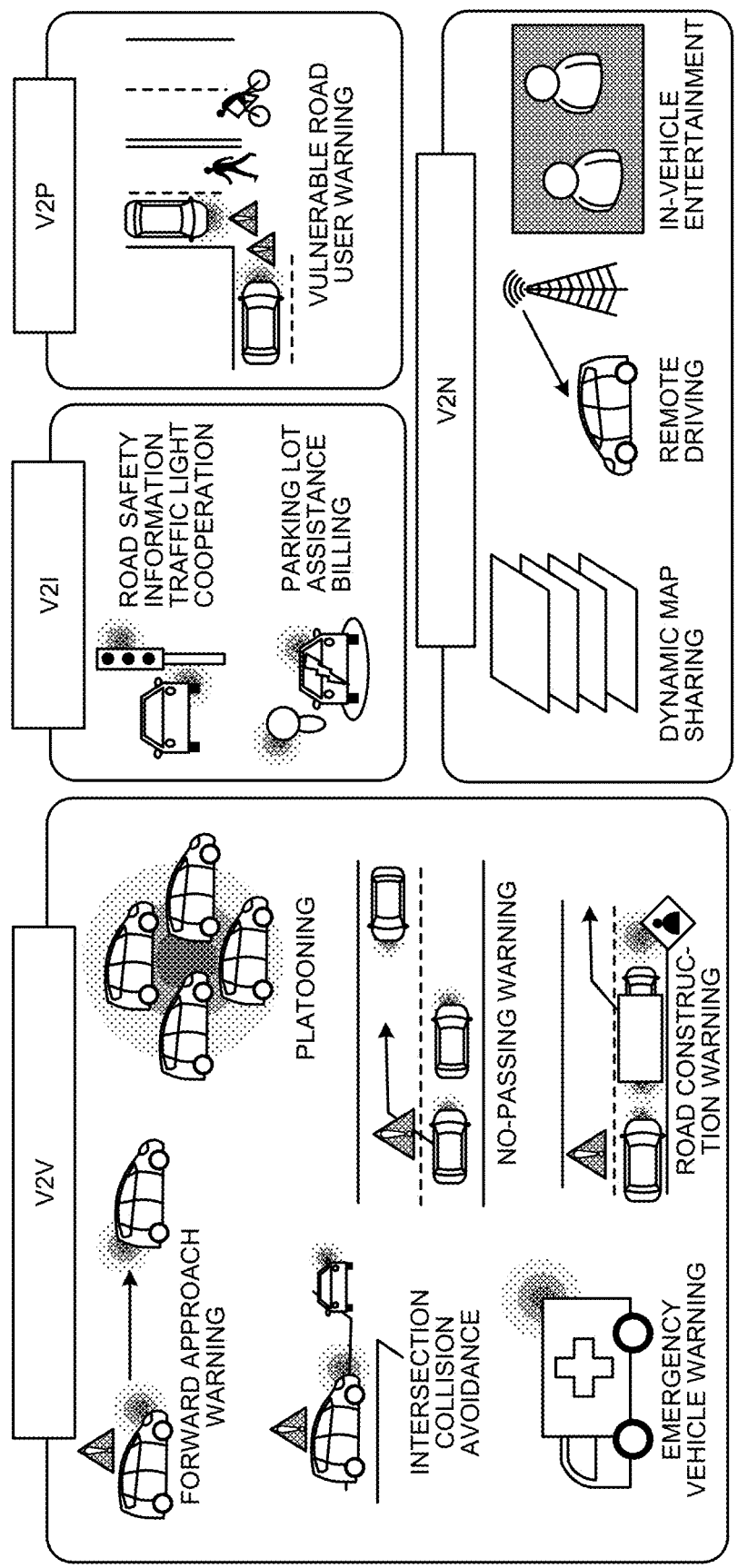
FIG. 3 is a view illustrating an example of a use case of the V2X communication.

FIG. 3 is a view illustrating an example of a use case of the V2X communication. As use cases of the V2V communication, there are a forward approach warning, intersection collision avoidance, emergency vehicle warning, platooning, no-passing warning, and road construction warning. In addition, as use cases of the V2I communication, there are notification of road safety information, traffic light cooperation, parking lot assistance, billing, and the like. In addition, as a use case of the V2P communication, there is a vulnerable road user warning or the like. In addition, as use cases of the V2N communication, there are dynamic map sharing, remote driving, and in-house entertainment.

The NR V2X communication supports a new use case that requires high reliability, low delay, high speed communication, and high capacity that cannot be supported by the LTE-based V2X in the past. In the example of FIG. 3, for example, provision of a dynamic map, remote driving, and the like are exemplified. In addition, there are sensor data sharing in which sensor data is exchanged between vehicles or between a road and a vehicle, and a platooning use case for platooning. These use cases and requirements of the NR V2X communication are described in 3GPP TR 22.886 and the like. (1) to (4) in the following are brief descriptions of some use cases.

(1) Vehicles Platooning

As a use case of the NR V2X communication, there is platooning. The platooning means that a plurality of vehicles travels in the same direction in a platoon. Information for controlling the platooning is exchanged between a vehicle that leads the platooning and another vehicle. The NR V2X communication is used for this exchange of the information. By exchanging the information by using the NR V2X communication, it becomes possible to further reduce an inter-vehicle distance in the platooning.

(2) Extended Sensors

As a use case of the NR V2X communication, there is an exchange of sensor-related information (raw data before data processing or processed data). Sensor information is collected through a local sensor, a surrounding vehicle, an RSU, a live video image between pedestrians, a V2X application server, or the like. By these information exchanges, a vehicle can acquire information that cannot be acquired from own sensor information, and can perceive/recognize a wider range of environment. In this use case, a high data rate is required for communication since a lot of information needs to be exchanged.

(3) Advanced Driving

As use cases of the NR V2X communication, there are semi-autonomous traveling and fully-autonomous traveling. The RSU shares perception/recognition information acquired from a sensor or the like owned by itself to surrounding vehicles. As a result, the vehicles can adjust trajectories and operation of the vehicles while synchronizing and cooperating with each other. By using the NR V2X communication, each of the vehicles can also share an intention or will of driving with the surrounding vehicles.

(4) Remote Driving

As a use case of the NR V2X communication, there is remote control by a remote operator or a V2X application. The remote control is used, for example, for a person who cannot drive or a dangerous region. Cloud computing-based control can also be used for public transportation in which a route and a traveling road are determined to some extent. In this use case, high reliability and low transmission delay are required for the communication.

Note that the use cases described above are merely examples. The use cases of the V2X communication of the present embodiment may be other use cases.

1-3. V2X Operation Scenario

Next, an example of a V2X communication operation scenario will be described. Although the communication between a base station and a terminal is only DL/UL communication and is simple in the V2N communication, various communication paths are conceivable in the V2V communication. Although each scenario will be described by utilization of an example of the V2V communication in the following description, a similar communication operation can be applied to V2P and V2I. In that case, the communication destination is not a vehicle but a pedestrian or an RSU.

(1) First Scenario

Figure 4:
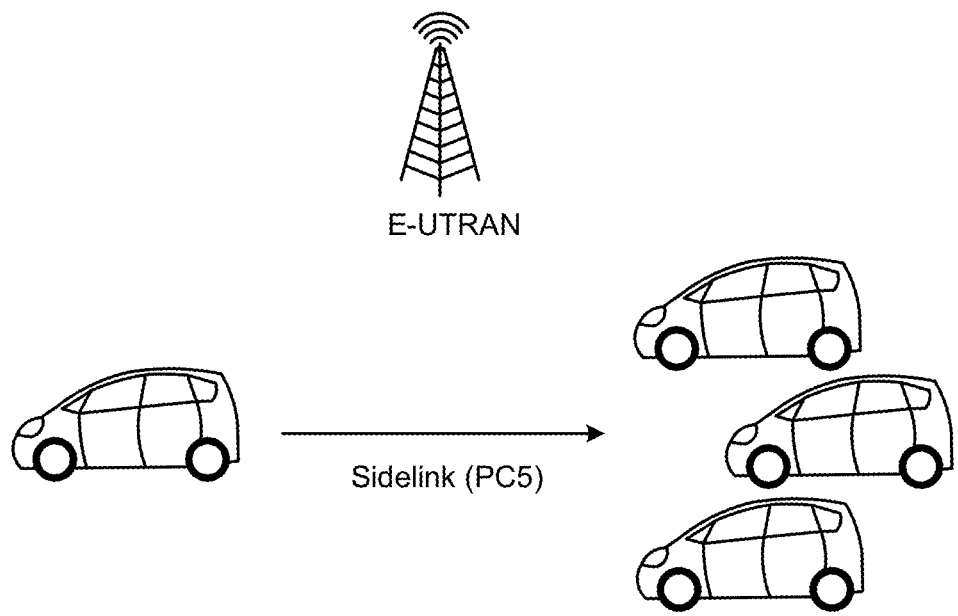
FIG. 4 is a view illustrating an example of V2V communication according to a first scenario.

FIG. 4 is an example of V2V communication according to the first scenario. In the first scenario, a vehicle and a vehicle directly communicate by using the sidelink communication. A sidelink is a communication link between terminals such as PC5. The sidelink may be also referred to as a V2V communication link, a V2P communication link, a V2I communication link, or the like in addition to PC5. In the example of FIG. 4, the vehicle and the vehicle directly communicate by using the sidelink communication without a radio access network. Note that evolved universal terrestrial radio access network (E-UTRAN) is illustrated as the radio access network in the example of FIG. 4. However, the radio access network is not limited to the E-UTRAN.

(2) Second Scenario

Figure 5:
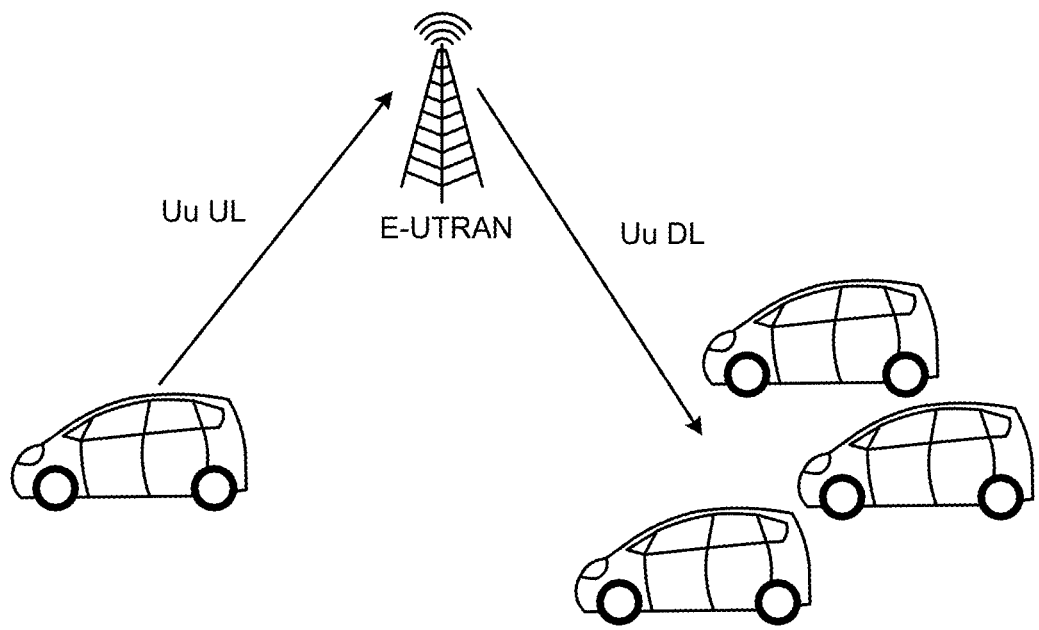
FIG. 5 is a view illustrating an example of V2V communication according to a second scenario.

FIG. 5 is an example of V2V communication according to the second scenario. In the second scenario, a vehicle and a vehicle communicate through a radio access network. In the example of FIG. 5, data is transmitted from one vehicle to a plurality of vehicles. Note that Uu indicates a Uu interface in FIG. 5. The Uu interface is a wireless interface between a terminal and a base station. UL indicates an uplink and DL indicates a downlink. The E-UTRAN is also illustrated as the radio access network in the example of FIG. 5. However, the radio access network is not limited to the E-UTRAN.

(3) Third Scenario

Figure 6:
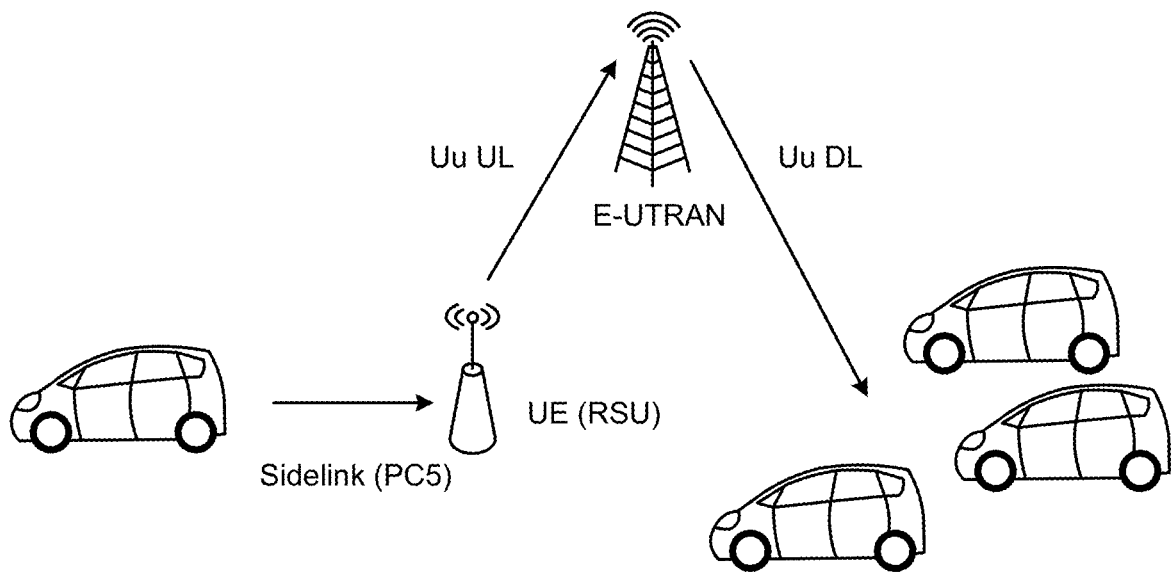
FIG. 6 is a view illustrating an example of V2V communication according to a third scenario.

FIG. 6 is an example of V2V communication according to the third scenario. In the third scenario, a vehicle and a vehicle communicate through an RSU and a radio access network. In the example of FIG. 6, data is also transmitted from one vehicle to a plurality of vehicles. In the example of FIG. 6, the one vehicle and the RSU are connected by the sidelink communication. The E-UTRAN is also illustrated as the radio access network in the example of FIG. 6. However, the radio access network is not limited to the E-UTRAN.

(4) Fourth Scenario

Figure 7:
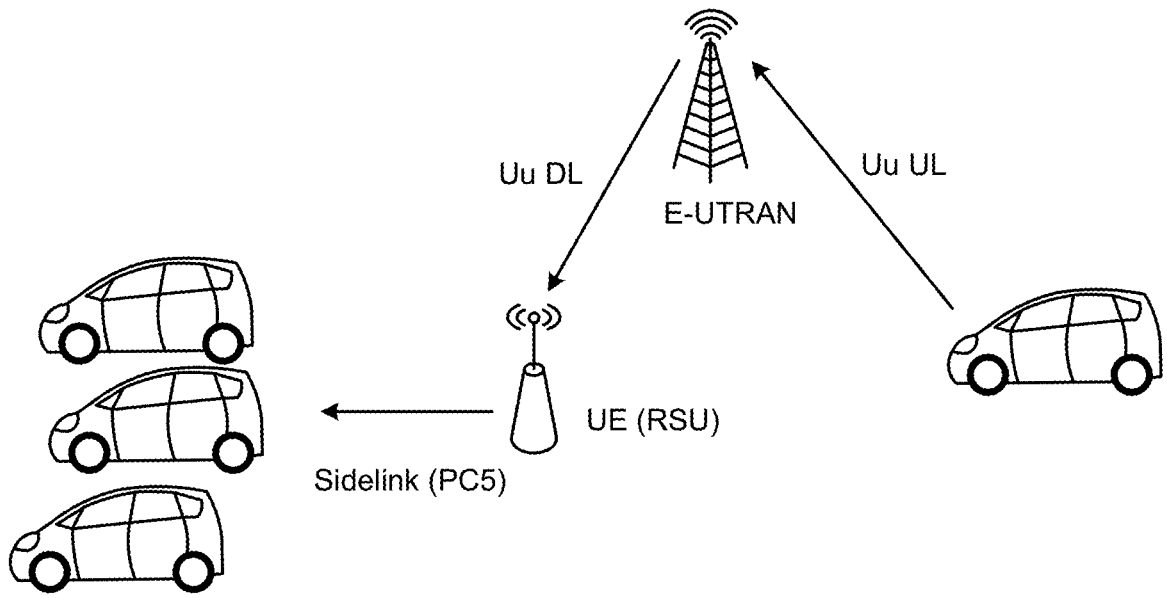
FIG. 7 is a view illustrating an example of V2V communication according to a fourth scenario.

FIG. 7 is an example of V2V communication according to the fourth scenario. In the fourth scenario, a vehicle and a vehicle communicate through an RSU and a radio access network. In the example of FIG. 7, a plurality of vehicles and the RSU are connected by the sidelink communication. The E-UTRAN is also illustrated as the radio access network in the example of FIG. 7. However, the radio access network is not limited to the E-UTRAN.

(5) Fifth Scenario

Figure 8:
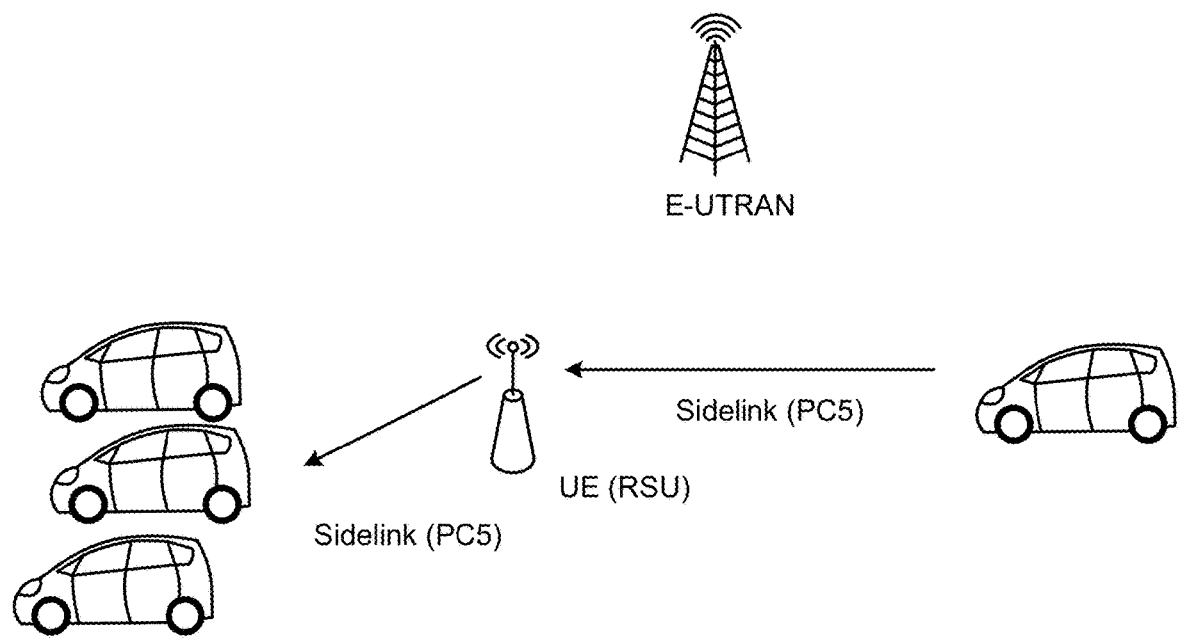
FIG. 8 is a view illustrating an example of V2V communication according to a fifth scenario.

FIG. 8 is an example of V2V communication according to the fifth scenario. In the fifth scenario, a vehicle and a vehicle communicate through an RSU without a radio access network. The RSU illustrated in FIG. 8 is a fixed station-type RSU.

(6) Sixth Scenario

Figure 9:
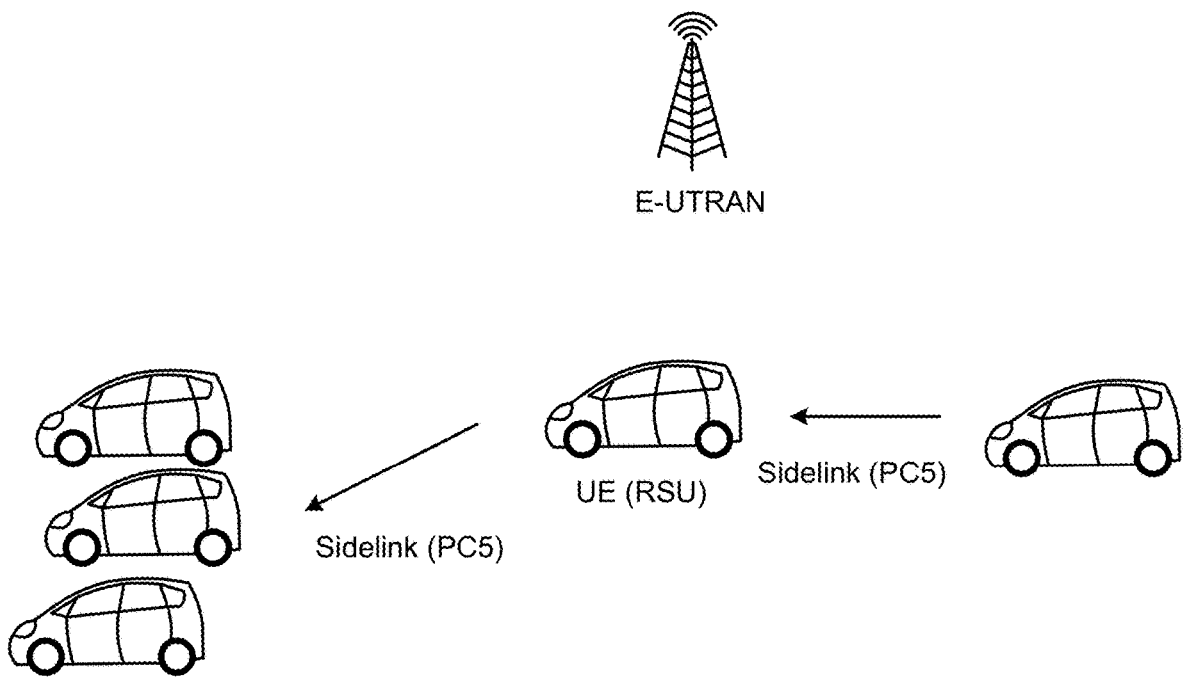
FIG. 9 is a view illustrating an example of V2V communication according to a sixth scenario.

FIG. 9 is an example of V2V communication according to the sixth scenario. In the sixth scenario, a vehicle and a vehicle communicate through an RSU without a radio access network. The RSU illustrated in FIG. 9 is a mobile station-type RSU.

1-4. Outline of Present Embodiment

Incidentally, in wireless communication including the V2X communication, it is very important to reduce overhead in order to improve performance such as a throughput of a system. For example, in multi-antenna communication such as MIMO communication, the overhead of a reference signal, control information, and the like used for channel estimation or the like increases in proportion to the number of antennas. In addition, in recent years, a standardization of massive MIMO communication that performs large-capacity communication using a large number of antennas has been started, and there is a concern about further increase in overhead.

For example, a Measurement basis is conventionally known as wireless communication environment measurement using a reference signal and a wireless communication parameter controlling method based thereon.

On the Measurement basis, for example, power measurement is performed on a reception side and feedback to a transmission side is performed with respect to "transmission power control". Then, the transmission side performs the transmission power control by using the feedback from the reception side.

Also, the reception side measures packet reception timing and feeds back a propagation delay to the transmission side with respect to "transmission timing". Then, the transmission side adjusts the reception timing at a reception point by performing a timing advance for the propagation delay.

Furthermore, with respect to "modulation and coding scheme (MCS)" and "resource allocation", the reception side performs channel state information (CSI) measurement and gives feedback to the transmission side. Then, the transmission side performs an MCS change and the resource allocation on the basis of the feedback.

Furthermore, with respect to "MIMO precoding", the reception side performs precoding matrix indicator (PMI), rank indicator (RI), and channel quality indicator (CQI) measurement, and determines weights. In addition, an indicator such as a layer indicator (LI) or a CSI-RS-resource indicator (CRI) may be considered. Measurement by a channel status indication reference signal (CSI-RS) may be performed. Application to beamforming is also possible.

Also, with respect to "handover", radio resource management (RRM) measurement is performed and an event trigger is performed on a side of a terminal device. Then, hand over (HO) determination is performed on a side of a base station.

In such a manner, in the radio communication parameter control relying only on the Measurement basis, many reference signals used for various kinds of measurement are necessary and an overhead is increased.

Thus, in the present embodiment, in order to reduce the overhead in the wireless communication, attention is paid to correlation corresponding to a position of a propagation path characteristic between transmission and reception. Specifically, for example, in an area in which a wireless communication environment is limited, propagation path characteristics between transmission and reception have correlation to some extent according to positions.

Thus, in the present embodiment, such correlation information is learned by machine learning and an appropriate wireless communication parameter is determined according to a terminal position on the basis of a result of the learning. Note that while the determination of the wireless communication parameter by the machine learning is effective, it is considered that there is a case where estimation accuracy deteriorates with dependence only on the determination.

Thus, in the present embodiment, hybrid-type wireless communication parameter determination using both of the Measurement basis using an existing reference signal and a machine learning (ML) basis is performed.

Note that an area in which the wireless communication environment is limited includes an environment in which communication quality between transmission and reception greatly depends on each base station terminal position, such as a road, a room interior, a factory, and a wireless backhaul. Thus, in the present embodiment, as a scenario in which the wireless communication environment is limited and a condition that terminal position information can be grasped is satisfied, communication between a base station and a terminal in the V2X communication is exemplified and will be described below. However, the present embodiment can be applied not only to the V2X communication but also to any wireless communication such as the communication between a base station and a terminal or direct communication between terminals. In addition, the application can be performed not only to cellular communication but also to any wireless access system such as wireless local area network (LAN) communication.

1-5. Operation Scenario of Present Embodiment

Figure 10:
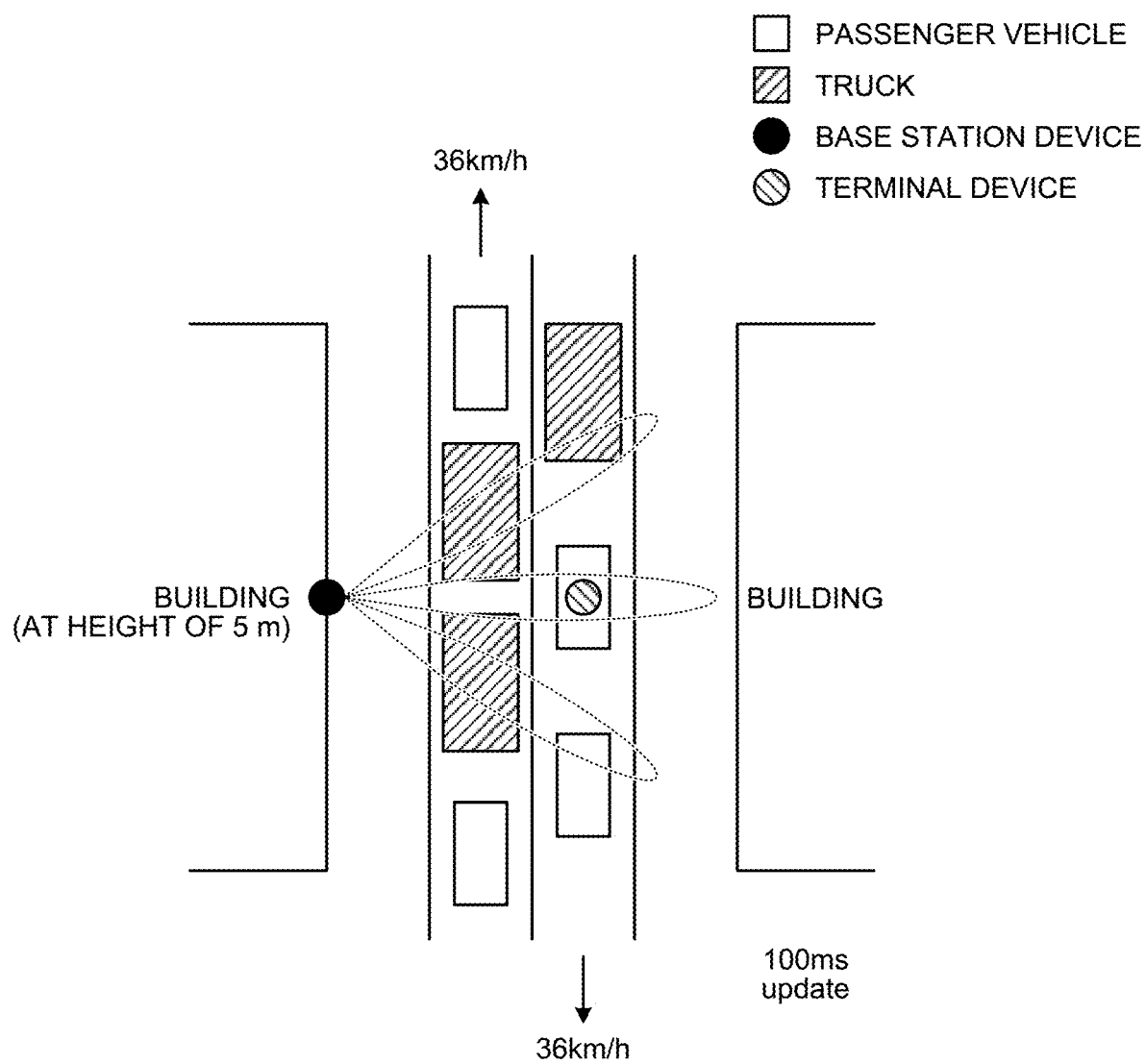
FIG. 10 is a view illustrating an operation scenario according to an embodiment of the present disclosure.

FIG. 10 is a view illustrating the operation scenario according to the embodiment of the present disclosure. In the present embodiment, a road environment is assumed. Here, as illustrated in FIG. 10, a scenario in which two buildings are arranged beside a road and a base station device is arranged at a position at a height of 5 m in one of the buildings is used. It is assumed that a two-lane road is arranged between the two buildings and a passenger vehicle and a truck travel on the road.

2. CONFIGURATION OF INFORMATION PROCESSING SYSTEM

In the following, an information processing system 1 according to the embodiment of the present disclosure will be described. The information processing system 1 is a mobile communication system including a plurality of communication devices (base station device and terminal device) capable of determining a wireless communication parameter on the Measurement basis and/or the ML basis.

The information processing system 1 is a wireless communication system using a predetermined radio access technology (RAT). For example, the information processing system 1 is a cellular communication system using the radio access technology such as wideband code division multiple access (W-CDMA), code division multiple access 2000 (cdma2000), long term evolution (LTE), or new radio (NR). Here, the cellular communication system is not limited to a cellular phone communication system, and may be ITS, for example. Note that the information processing system 1 is not limited to the cellular communication system, and may be another wireless communication system such as a wireless LAN system, an aeronautical radio system, or a space radio communication system, for example.

The information processing system 1 provides a function of executing application processing (such as edge function) to the terminal device via a wireless network using the radio access technology such as LTE or NR. LTE and NR are a type of a cellular communication technology, and enable mobile communication of the terminal device by an arrangement of a plurality of areas, which is covered by the base station device, in a cellular manner.

Note that it is assumed that "LTE" includes LTE-Advanced (LTE-A), LTE-Advanced Pro (LTE-A Pro), and Evolved Universal Terrestrial Radio Access (EUTRA) in the following description. In addition, it is assumed that NR includes a new radio access technology (NRAT) and Further EUTRA (FEUTRA). Note that a single base station may manage a plurality of cells. A cell corresponding to LTE may be referred to as an LTE cell. Also, a cell corresponding to NR may be referred to as an NR cell.

NR is a radio access technology (RAT) in a next generation of LTE (fifth generation). NR is the radio access technology that can support various use cases including enhanced mobile broadband (eMBB), massive machine type communications (mMTC), and ultra-reliable and low latency communications (URLLC). NR has been studied to be a technical framework corresponding to usage scenarios, requirements, arrangement scenarios, and the like in these use cases.

Note that an LTE base station may be referred to as an evolved Node B (eNodeB) or an eNB. Furthermore, an NR base station may be referred to as a gNodeB or a gNB. In LTE and NR, the terminal device may be referred to as user equipment (UE).

2-1. Overall Configuration of Information Processing System

Figure 11:
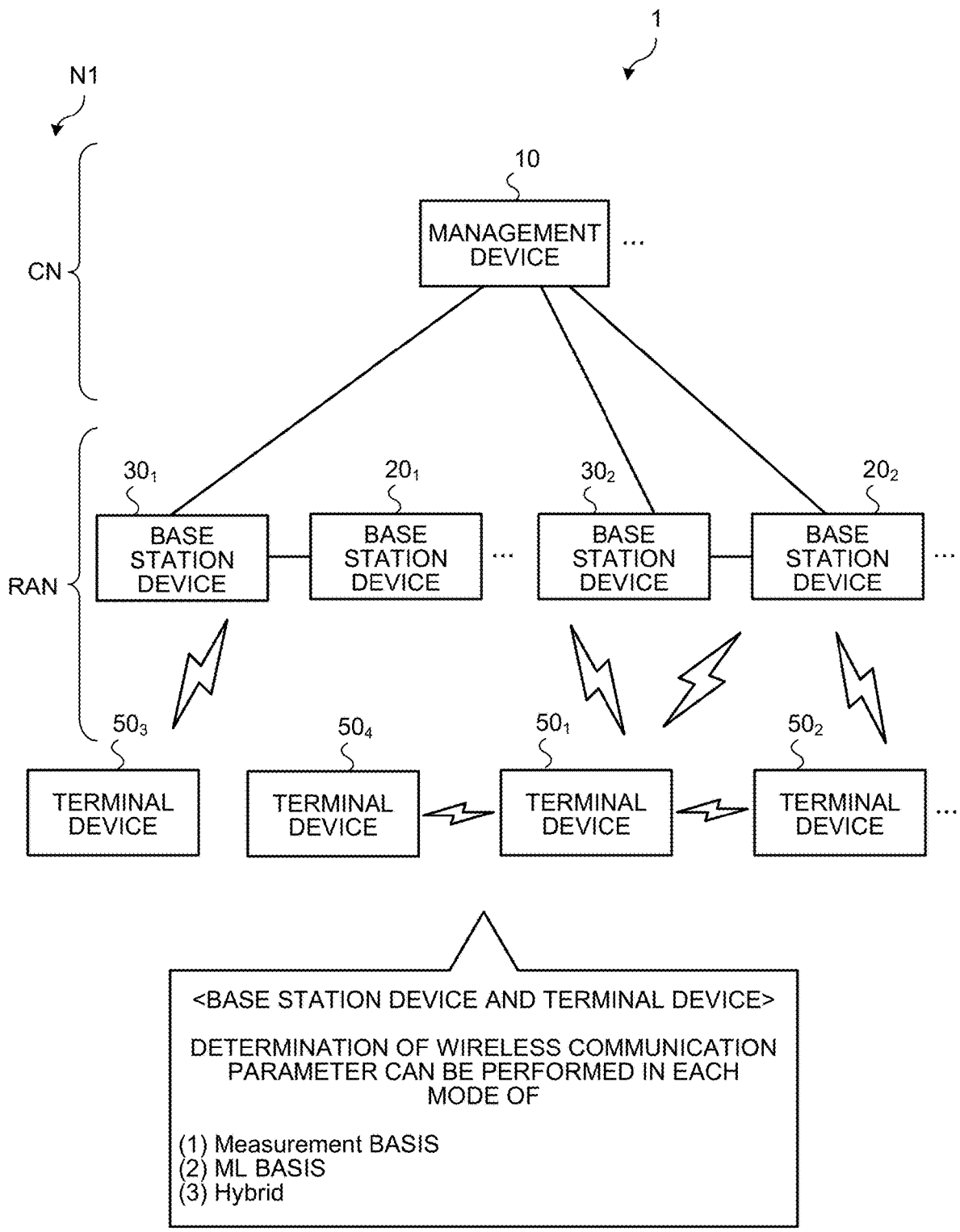
FIG. 11 is a view illustrating a configuration example of an information processing system according to the embodiment of the present disclosure.
Figure 12:
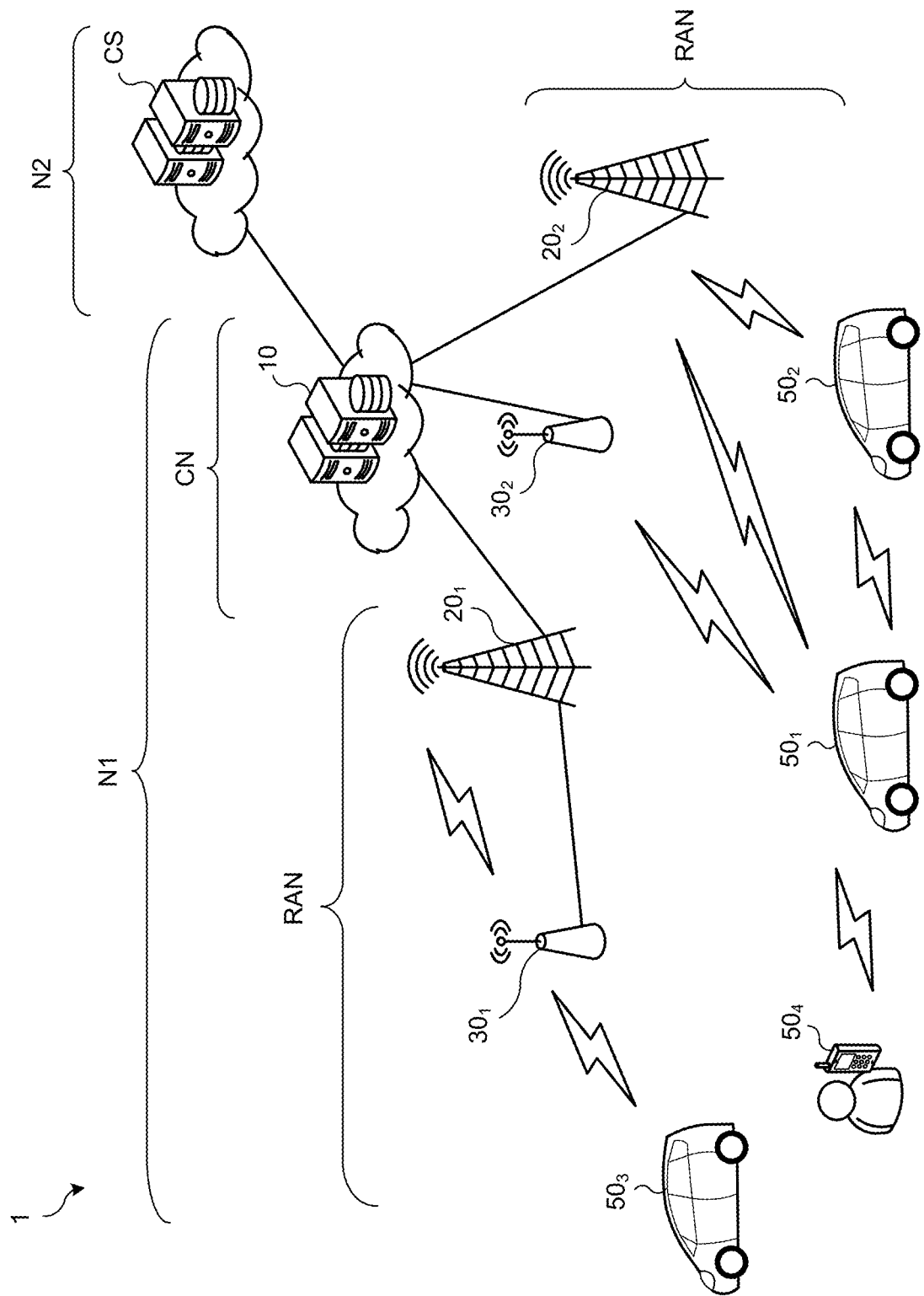
FIG. 12 is a view illustrating a specific configuration example of the information processing system.

FIG. 11 is a view illustrating a configuration example of the information processing system 1 according to the embodiment of the present disclosure. The information processing system 1 includes a management device 10, a base station device 20, a base station device 30, and a terminal device 50. Also, FIG. 12 is a view illustrating a specific configuration example of the information processing system 1. The information processing system 1 may include a cloud server device CS in addition to the above configuration.

A network N1 includes the plurality of devices included in the information processing system 1. The network N1 is, for example, a wireless network. For example, the network N1 is a mobile communication network configured by utilization of the radio access technology such as LTE or NR. The network N1 includes a radio access network RAN and a core network CN.

Note that the devices in the drawing may be considered as devices in a logical sense. That is, a part of the devices in the drawing may be realized by a virtual machine (VM), a container, a docker, or the like, and may be implemented on the same hardware physically.

[Cloud Server Device]

The cloud server device CS is a processing device (such as server device) connected to a network N2. For example, the cloud server device CS is a server host computer that processes a request from a client computer (such as terminal device 50). The cloud server device CS may be a PC server, a midrange server, or a mainframe server. Here, the network N2 is a communication network connected to the network N1 via a gateway device (such as S-GW or P-GW). Here, the network N2 is, for example, a communication network such as the Internet, a regional Internet Protocol (IP) network, or a telephone network (such as fixed telephone network or mobile telephone network). Note that the cloud server device can be rephrased as a server device, a processing device, or an information processing device.

[Management Device]

The management device 10 is a device that manages the wireless network. For example, the management device 10 is a device that functions as a mobility management entity (MME) or an access and mobility management function (AMF). Together with the gateway device, the management device 10 is included in a part of a core network CN. The core network CN is a network of a predetermined entity such as a mobile network operator. For example, the core network CN is an evolved packet core (EPC) or a 5G core network (5GC). Note that the predetermined entity may be the same as or different from an entity that uses, operates, and/or manages the base station devices 20 and 30.

Note that the management device 10 may have a function of a gateway. For example, when the core network is the EPC, the management device 10 may have a function as an S-GW or a P-GW. Furthermore, when the core network is the 5GC, the management device 10 may have a function as a user plane function (UPF). Note that the management device 10 is not necessarily a device included in the core network CN. For example, it is assumed that the core network CN is a core network of W-CDMA or cdma2000. Here, the management device 10 may be a device that functions as a radio network controller (RNC).

The management device 10 is connected to each of a plurality of the base station devices 20 and a plurality of the base station devices 30. The management device 10 manages communication between the base station devices 20 and the base station devices 30. For example, the management device 10 grasps and manages, for each terminal device 50, to which base station device (or which cell) the terminal device 50 in the network N1 is connected, in a communication area of which base station device (or which cell) the terminal device 50 exists, and the like. The cells are, for example, a primary cell (pCell) and a secondary cell (sCell). In the cells, radio resources (such as frequency channel, component carrier, and the like) that can be used by the terminal device 50 may differ from cell to cell. Furthermore, one base station device may provide the plurality of cells.

[Base Station Device]

Each of the base station devices 20 is a wireless communication device that performs wireless communication with the terminal device 50. The base station device 20 is a device included in a network in the V2N communication. The base station device 20 is a type of communication device. The base station device 20 is, for example, a device corresponding to a wireless base station (such as base station, Node B, eNB, or gNB) or a wireless access point (access point). The base station device 20 may be a wireless relay station. The base station device 20 may be an optical extension device called a remote radio head (RRH). In the present embodiment, a base station of the wireless communication system may be referred to as a base station device. The base station device 20 may be configured to be able to wirelessly communicate with another base station device 20 and the base station devices 30. Note that the radio access technology used by the base station device 20 may be the cellular communication technology or a wireless LAN technology. Obviously, the radio access technology used by the base station device 20 is not limited to these, and may be another radio access technology. Furthermore, the wireless communication used by the base station device 20 may be wireless communication using radio waves or wireless communication using infrared rays or visible light (optical wireless).

Each of the base station devices 30 is a wireless communication device that performs wireless communication with the terminal device 50. The base station device 30 is a device included in an infrastructure in the V2I communication. The base station device 30 is a type of communication device similarly to the base station devices 20. The base station device 30 is, for example, a device corresponding to a wireless base station (such as base station, Node B, eNB, or gNB) or a wireless access point (access point). The base station device 30 may be a wireless relay station. The base station device 30 may be an on-road base station device such as a road side unit (RSU). Furthermore, the base station device 20 may be an optical extension device called a remote radio head (RRH). The base station device 30 may be configured to be able to wirelessly communicate with another base station device 30 and the base station devices 20. Note that the radio access technology used by the base station device 30 may be the cellular communication technology or the wireless LAN technology. Obviously, the radio access technology used by the base station device 20 is not limited to these, and may be another radio access technology. Furthermore, the wireless communication used by the base station device 30 may be the wireless communication using radio waves or the wireless communication using infrared rays or visible light (optical wireless).

Note that the base station devices 20 and 30 may be able to communicate with each other via a base station device-core network interface (such as S1 interface or the like). This interface may be either wired or wireless. Furthermore, the base station devices may be able to communicate with each other via an inter-base station device interface (such as X2 interface, S1 Interface, or the like). This interface may be either wired or wireless.

The base station devices 20 and 30 can be used, operated, and/or managed by various entities. For example, a mobile network operator (MNO), a mobile virtual network operator (MVNO), a mobile virtual network enabler (MVNE), a neutral host network (NHN) operator, an enterprise, an educational institution (such as incorporated educational institution, or board of education of each local government), a real estate (such as building or apartment) manager, an individual, and the like can be assumed as the entities. Obviously, the subjects of use, operation, and/or management of the base station devices 20 and 30 are not limited to these. The base station devices 20 and 30 may be installed and/or operated by one business operator or may be installed and/or operated by one individual. Obviously, the subjects of installation/operation of the base station devices 20 are not limited to these. For example, the base station devices 20 and 30 may be installed/operated jointly by a plurality of business operators or a plurality of individuals. Furthermore, the base station devices 20 and 30 may be shared facilities used by the plurality of business operators or the plurality of individuals. In this case, installation and/or operation of the facilities may be performed by a third party different from users.

Note that the concept of the base station devices (also referred to as base station) includes not only a donor base station but also a relay base station (also referred to as relay station or relay station device). In addition, the concept of the base stations includes not only a structure having a function of the base stations but also a device installed in the structure. The structure is, for example, a building such as a high-rise building, house, steel tower, station facility, airport facility, port facility, or stadium. Note that the concept of the structure includes not only a building but also non-building structures such as a tunnel, bridge, dam, wall, and steel pole, and facilities such as a crane, gate, and windmill. In addition, the concept of the structure includes not only a structure on land (on the ground in a narrow sense) or in the ground, but also structures on the water, such as a pier and mega-float, and a structure under the water, such as an oceanographic observation facility. The base station devices can be rephrased as processing devices or information processing devices.

The base station devices 20 and 30 may be fixed stations or base station devices configured to be movable (mobile station). For example, the base station devices 20 and 30 may be devices installed in a mobile body or may be mobile bodies themselves. For example, a relay station device having mobility can be regarded as the base station devices 20 and 30 as mobile stations. In addition, a device which originally has mobility, such as a vehicle, drone, or smartphone and in which a function of a base station device (at least a part of the function of the base station device) is mounted also corresponds to the base station devices 20 and 30 as the mobile stations.

Here, the mobile body may be a mobile terminal such as a smartphone or cellular phone. In addition, the mobile body may be a mobile body that moves on land (on the ground in a narrow sense) (for example, vehicle such as automobile, bicycle, bus, truck, motorcycle, train, or linear motor car) or may be a mobile body that moves in the ground (for example, in tunnel) (such as subway). In addition, the mobile body may be a mobile body that moves over water (for example, ship such as passenger ship, cargo ship, or hovercraft) or may be a mobile body that moves under the water (for example, submersible ship such as submersible vehicle, submarine, or unmanned submersible). Furthermore, the mobile body may be a mobile body that moves in the atmosphere (for example, aircraft such as airplane, airship, or a drone) or a mobile body that moves outside the atmosphere (for example, artificial celestial body such as artificial satellite, spacecraft, space station, or probe).

Furthermore, the base station devices 20 and 30 may be ground base station devices installed on the ground (ground station device). For example, the base station devices 20 and 30 may be base station devices arranged in a structure on the ground, or may be base station devices installed in a mobile body that moves on the ground. More specifically, the base station devices 20 and 30 may be an antenna installed in a structure such as a building, and a signal processing device connected to the antenna. Obviously, the base station devices 20 and 30 may be structures or mobile bodies themselves. "On the ground" means to be on the ground in a broad sense including not only being on land (on the ground in a narrow sense) but also being in the ground, on the water, and under the water. Note that the base station devices 20 and 30 are not limited to the ground base station devices. The base station devices 20 and 30 may be non-ground base station devices (non-ground station devices) capable of floating in the air or space. For example, the base station devices 20 and 30 may be aircraft station devices or satellite station devices.

The aircraft station device is a wireless communication device capable of floating in the atmosphere, such as an aircraft. The aircraft station device may be a device mounted on the aircraft or the like, or may be the aircraft itself. Note that the concept of the aircraft includes not only a heavier-than-air aircraft such as an airplane or glider but also a lighter-than-air aircraft such as a balloon and airship. In addition, the concept of the aircraft includes not only the heavier-than-air aircraft and the lighter-than-air aircraft but also a rotorcraft such as a helicopter and autogiro. Note that the aircraft station device (or aircraft on which the aircraft station device is mounted) may be an unmanned aircraft such as a drone. Note that the concept of the unmanned aircraft also includes unmanned aircraft systems (UAS) and tethered UAS. In addition, the concept of the unmanned aircraft also includes lighter than air UAS (LTA) and heavier than air UAS (HTA). Furthermore, the concept of the unmanned aircraft also includes high altitude UAS platforms (HAPs).

The satellite station device is a wireless communication device capable of floating outside the atmosphere. The satellite station device may be a device mounted on a space mobile body such as an artificial satellite, or may be the space mobile body itself. A satellite serving as the satellite station device may be any of a low earth orbiting (LEO) satellite, a medium earth orbiting (MEO) satellite, a geostationary earth orbiting (GEO) satellite, and a highly elliptical orbiting (HEO) satellite. Obviously, the satellite station device may be a device mounted on the low earth orbiting satellite, the middle earth orbiting satellite, the geostationary earth orbiting satellite, or the high elliptical orbiting satellite.

The magnitude of coverage of the base station devices 20 and 30 may be large in such a manner as macro cells or small in such a manner as picocells. Obviously, the magnitude of coverage of the base station devices 20 and 30 may be extremely small in such a manner as femtocells. In addition, the base station devices 20 and 30 may have a beamforming capability. In this case, the base station devices 20 and 30 may form a cell or a service area for each beam.

[Terminal Device]

The terminal device 50 is a wireless communication device that performs wireless communication with the base station devices 20 or base station devices 30. The terminal device 50 may be a movable wireless communication device. In such a case, the terminal device 50 may be a wireless communication device installed in a mobile body or may be a mobile body itself. For example, the terminal device 50 may be a vehicle that moves on a road, such as an automobile, bus, truck, or motorcycle, or a wireless communication device mounted on the vehicle. Furthermore, the terminal device 50 may be a machine to machine (M2M) device or an Internet of Things (IoT) device. Furthermore, the terminal device 50 may be a cellular phone, smart device (smartphone or tablet), personal digital assistant (PDA), personal computer, or the like. Furthermore, the terminal device 50 can perform sidelink communication with another terminal device 50. Note that the wireless communication (including sidelink communication) used by the terminal device 50 may be wireless communication using radio waves or wireless communication using infrared rays or visible light (optical wireless).

Note that the "terminal device" is a type of communication device, and is also referred to as a terminal device or terminal, or a mobile device, mobile station, or mobile station device in a case of being movable. The concept of the movable terminal device includes not only a communication device configured to be movable but also a mobile body in which the communication device is installed. Here, the mobile body may be a mobile terminal, or may be a mobile body that moves on land (on the ground in a narrow sense), in the ground, on the water, or under the water. Furthermore, the mobile body may be a mobile body that moves in the atmosphere, such as a drone or helicopter, or may be a mobile body that moves outside the atmosphere, such as an artificial satellite.

In the present embodiment, the concept of the communication device includes not only a portable terminal device such as a mobile terminal but also a device installed in a structure or mobile body. The structure or mobile body itself may be regarded as the communication device. Furthermore, the concept of the communication device includes not only a mobile device (such as terminal device or automobile) but also a base station device (such as donor base station or relay base station). The communication device is a type of processing device and information processing device.

The terminal device 50 and the base station devices 20 and 30 are connected to each other by wireless communication (such as radio waves or optical wireless). In a case where the terminal device 50 moves from a communication area (or cell) of a certain base station device to a communication area (or cell) of another base station device, handover (or handoff) is performed.

The terminal device 50 may be simultaneously connected to a plurality of base station devices or a plurality of cells and perform communication. For example, in a case where one base station device supports a communication area via a plurality of cells (such as pCell and sCell), the terminal device 50 can communicate with the base station device with the plurality of cells being bundled by a carrier aggregation (CA) technology, dual connectivity (DC) technology, or multi-connectivity (MC) technology. Alternatively, via cells of different base station devices, the terminal device 50 and the plurality of base station devices can communicate with each other by a coordinated multi-point transmission and reception (CoMP) technology.

Note that the terminal device 50 is not necessarily a device directly used by a person. The terminal device 50 may be a sensor installed in a machine or the like in a factory, for example, in a manner of so-called machine type communication (MTC). Furthermore, the terminal device 50 may be an M2M device or IoT device. Furthermore, the terminal device 50 may be a device having a relay communication function, for example, in a manner represented by device to device (D2D) or V2X. Furthermore, the terminal device 50 may be a device called a client premises equipment (CPE) used for wireless backhaul or the like.

[Mode]

Here, as illustrated in FIG. 11, the base station devices 20 and 30 and the terminal device 50 have the following three modes (1) to (3), and can determine the wireless communication parameter in each mode.

(1) Measurement Basis

The Measurement basis is a mode of performing wireless communication environment measurement using a conventional reference signal, and determination of a wireless communication parameter based thereon.

(2) ML Basis

The ML-basis is a mode of performing determination of a wireless communication parameter based on a learning result of machine learning.

(3) Hybrid

The Hybrid is a mode of performing determination of a wireless communication parameter by using the Measurement basis and/or ML basis.

Hereinafter, a configuration of each device including the information processing system 1 according to the present embodiment will be specifically described.

2-2. Configuration of Management Device

The management device 10 is a device that manages the wireless network. For example, the management device 10 is a device that manages communication between the base station devices 20 and 30. When the core network CN is the EPC, the management device 10 is, for example, a device having a function as an MME. Furthermore, when the core network CN is the 5GC, the management device 10 is, for example, a device having a function as an AMF. The management device 10 has a function of executing application processing (such as edge function), and may function as a server device such as an application server.

Figure 13:
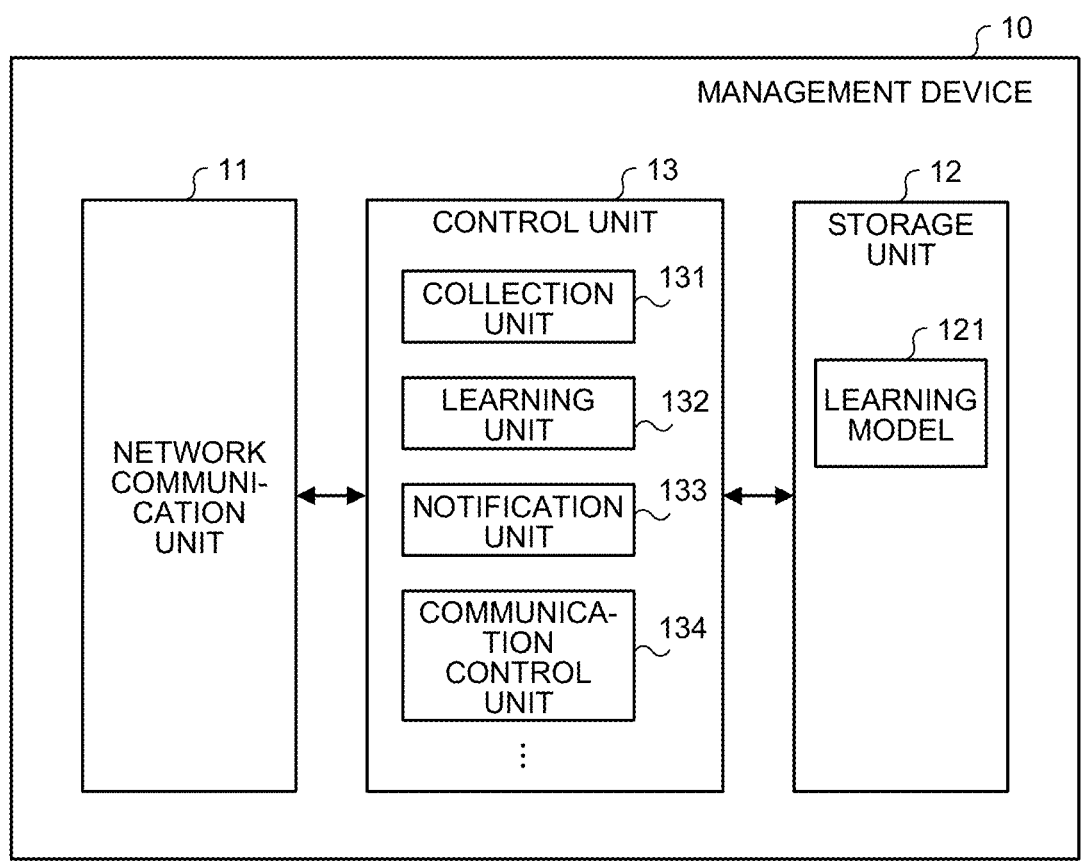
FIG. 13 is a view illustrating a configuration example of a management device according to the embodiment of the present disclosure.

FIG. 13 is a view illustrating a configuration example of the management device 10 according to the embodiment of the present disclosure. The management device 10 includes a network communication unit 11, a storage unit 12, and a control unit 13. Note that the configuration illustrated in FIG. 13 is a functional configuration, and a hardware configuration may be different therefrom. Furthermore, functions of the management device 10 may be implemented in a manner of being distributed in a plurality of physically separated configurations. For example, the management device 10 may include a plurality of server devices.

The network communication unit 11 is a communication interface for communicating with other devices. The network communication unit 11 may be a network interface or a device connection interface. The network communication unit 11 has a function of directly or indirectly connected to the network N1. For example, the network communication unit 11 may include a LAN interface such as a network interface card (NIC), or may include a USB interface including a universal serial bus (USB) host controller, a USB port, and the like. Furthermore, the network communication unit 11 may be a wired interface or a wireless interface. The network communication unit 11 functions as a communication means of the management device 10. The network communication unit 11 communicates with the base station devices 20 and 30 under the control of the control unit 13.

The storage unit 12 is a data readable/writable storage device such as a dynamic random access memory (DRAM), static random access memory (SRAM), flash memory, or hard disk. The storage unit 12 functions as a storage means of the management device 10. The storage unit 12 stores a learning model 121 and the like. The learning model 121 is a learning result of machine learning used on the ML basis, and is generated by a learning unit 132 (described later). A series of operations that is related to the ML basis and that includes generation of the learning model 121 will be described later. Furthermore, for example, the storage unit 12 stores a connection state of the terminal device 50. For example, the storage unit 12 stores a state of radio resource control (RRC) and a state of EPS connection management (ECM) of the terminal device 50. The storage unit 12 may function as a home memory that stores positional information of the terminal device 50.

The control unit 13 is a controller that controls each unit of the management device 10. The control unit 13 is realized by, for example, a processor such as a central processing unit (CPU) or micro processing unit (MPU). For example, the control unit 13 is realized by the processor executing various programs stored in the storage device inside the management device 10 by using a random access memory (RAM) or the like as a work area. Note that the control unit 13 may be realized by an integrated circuit such as an application specific integrated circuit (ASIC) or a field programmable gate array (FPGA). Each of the CPU, MPU, ASIC, and FPGA can be regarded as a controller.

As illustrated in FIG. 13, the control unit 13 includes a collection unit 131, a learning unit 132, a notification unit 133, and a communication control unit 134. Each of the blocks (collection unit 131 to communication control unit 134) included in the control unit 13 is a functional block indicating a function of the control unit 13. These functional blocks may be software blocks or hardware blocks. For example, each of the above-described functional blocks may be one software module realized by software (including microprogram), or may be one circuit block on a semiconductor chip (die). Obviously, each functional block may be one processor or one integrated circuit. A configuration method of the functional blocks is arbitrary. Note that the control unit 13 may be configured in functional units different from the above-described functional blocks. An operation of each of the blocks included in the control unit 13 will be described later in detail.

2-3. Configuration of Base Station Device (Network)

Next, a configuration of the base station device 20 will be described. The base station device 20 is a wireless communication device that performs wireless communication with the terminal device 50. The base station device 20 is, for example, a device that functions as a wireless base station, wireless relay station, wireless access point, or the like. Here, the base station device 20 may be an optical extension device such as an RRH. As described above, the base station device 20 is a device included in a network in the V2N communication.

Figure 14:
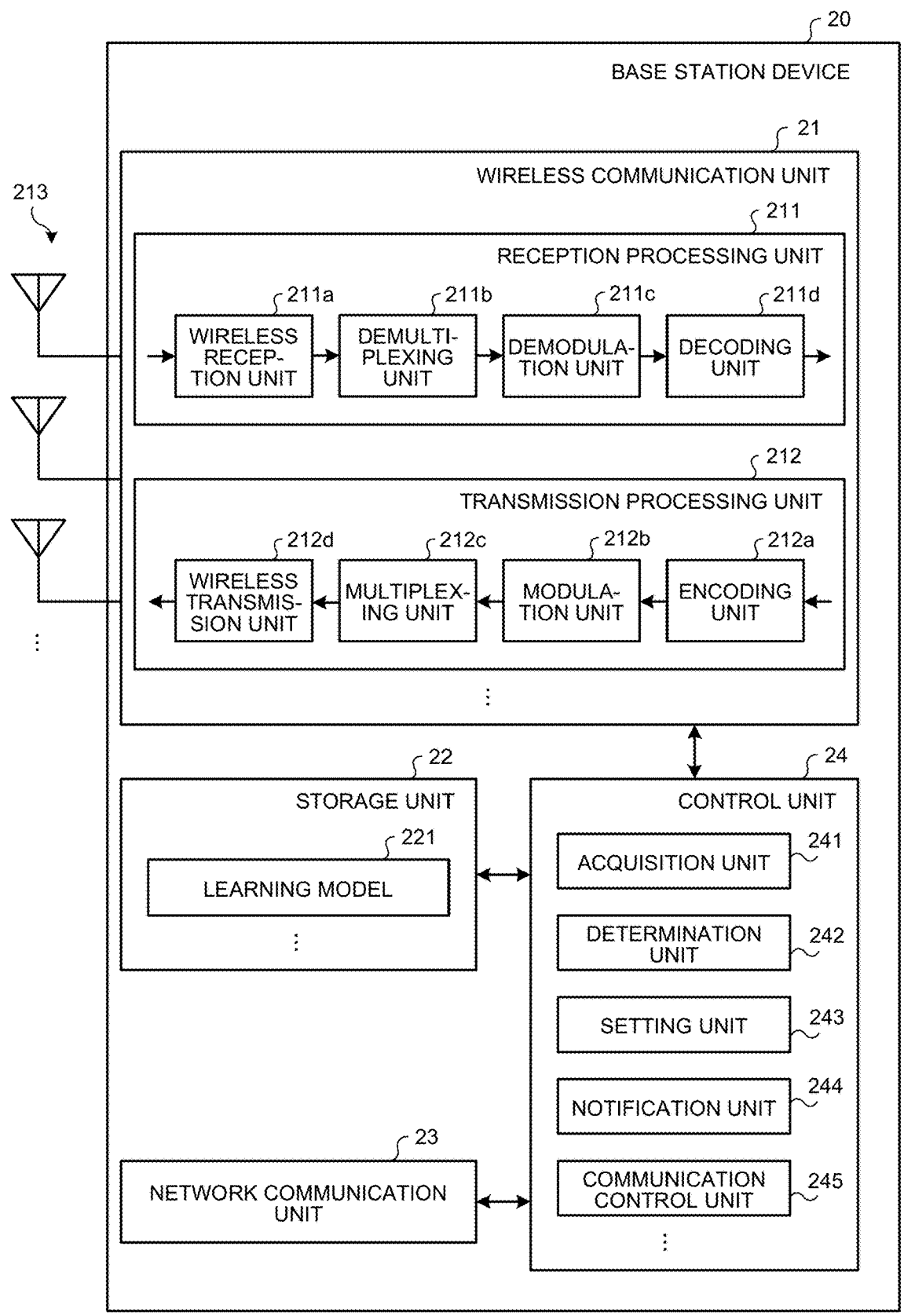
FIG. 14 is a view illustrating a configuration example of a base station device according to the embodiment of the present disclosure.

FIG. 14 is a view illustrating a configuration example of the base station device 20 according to the embodiment of the present disclosure. The base station device 20 includes a wireless communication unit 21, storage unit 22, network communication unit 23, and control unit 24. Note that the configuration illustrated in FIG. 14 is a functional configuration, and a hardware configuration may be different therefrom. Furthermore, functions of the base station device 20 may be implemented in a manner of being distributed in a plurality of physically separated configurations.

The wireless communication unit 21 is a wireless communication interface that wirelessly communicates with other radio communication devices (such as terminal device 50, base station device 30, and another base station device 20). The wireless communication unit 21 operates under the control of the control unit 24. Note that the wireless communication unit 21 may be compatible with a plurality of radio access methods. For example, the wireless communication unit 21 may be compatible with both NR and LTE. The wireless communication unit 21 may be compatible with W-CDMA and cdma2000 in addition to NR and LTE. Obviously, the wireless communication unit 21 may be compatible with a radio access method other than NR, LTE, W-CDMA, and cdma2000.

The wireless communication unit 21 includes a reception processing unit 211, a transmission processing unit 212, and an antenna 213. The wireless communication unit 21 may include a plurality of the reception processing units 211, a plurality of the transmission processing units 212, and a plurality of the antennas 213. Note that in a case where the wireless communication unit 21 is compatible with the plurality of radio access methods, each unit of the wireless communication unit 21 may be configured individually for each of the radio access methods. For example, the reception processing unit 211 and the transmission processing unit 212 may be individually configured for LTE and NR.

The reception processing unit 211 processes an uplink signal received via the antenna 213. The reception processing unit 211 includes a wireless reception unit 211a, a demultiplexing unit 211b, a demodulation unit 211c, and a decoding unit 211d.

The wireless reception unit 211a performs down-conversion, a removal of an unnecessary frequency component, control of an amplification level, a quadrature demodulation, conversion into a digital signal, a removal of a guard interval, an extraction of a frequency domain signal by fast Fourier transform, and the like on the uplink signal. The demultiplexing unit 211b demultiplexes an uplink channel such as a physical uplink shared channel (PUSCH) or a physical uplink control channel (PUCCH) and an uplink reference signal from a signal output from the wireless reception unit 211a. The demodulation unit 211c demodulates a received signal by using a modulation method such as binary phase shift keying (BPSK) or quadrature phase shift keying (QPSK) with respect to a modulation symbol of the uplink channel. The modulation method used by the demodulation unit 211c may be 16 quadrature amplitude modulation (QAM), 64-QAM, or 256-QAM. The decoding unit 211d performs decoding processing on the demodulated encoded bit of the uplink channel. The decoded uplink data and uplink control information are output to the control unit 24.

The transmission processing unit 212 performs transmission processing of downlink control information and downlink data. The transmission processing unit 212 includes an encoding unit 212a, a modulation unit 212b, a multiplexing unit 212c, and a wireless transmission unit 212d.

The encoding unit 212a encodes the downlink control information and downlink data input from the control unit 24 by using an encoding method such as block encoding, convolutional encoding, turbo encoding, or the like. The modulation unit 212b modulates encoded bits output from the encoding unit 212a by a predetermined modulation method such as BPSK, QPSK, 16-QAM, 64-QAM, or 256-QAM. The multiplexing unit 212c multiplexes a modulation symbol of each channel and a downlink reference signal, and performs an arrangement thereof in a predetermined resource element. The wireless transmission unit 212d performs various kinds of signal processing on a signal from the multiplexing unit 212c. For example, the wireless transmission unit 212d performs processing such as conversion into a time domain by fast Fourier transform, addition of a guard interval, generation of a baseband digital signal, conversion into an analog signal, a quadrature modulation, up-conversion, a removal of an extra frequency component, and power amplification. A signal generated by the transmission processing unit 212 is transmitted from the antenna 213.

The storage unit 22 is a storage device capable of reading and writing data, such as a DRAM, SRAM, flash memory, or hard disk. The storage unit 22 functions as a storage means of the base station device 20. The storage unit 22 stores a learning model 221 and the like. The learning model 221 corresponds to the learning model 121 generated in the management device 10 and notified to the base station device 20. A series of operations that is related to the ML basis and that uses the learning model 221 will be described later.

The network communication unit 23 is a communication interface for communicating with other devices (such as management device 10, another base station device 20, base station device 30, and cloud server device CS). The network communication unit 23 has a function of being directly or indirectly connected to the network N1. For example, the network communication unit 23 includes a LAN interface such as an NIC. Furthermore, the network communication unit 23 may be a wired interface or a wireless interface. The network communication unit 23 functions as a network communication means of the base station device 20. The network communication unit 23 communicates with other devices (such as management device 10 and cloud server device CS) under the control of the control unit 24. The configuration of the network communication unit 23 may be similar to that of the network communication unit 11 of the management device 10.

The control unit 24 is a controller that controls each unit of the base station device 20. The control unit 24 is realized by, for example, a processor such as a CPU or an MPU. For example, the control unit 24 is realized by the processor executing various programs stored in the storage device inside the base station device 20 by using a RAM or the like as a work area. Note that the control unit 24 may be realized by an integrated circuit such as an ASIC or FPGA. Each of the CPU, MPU, ASIC, and FPGA can be regarded as a controller.

As illustrated in FIG. 14, the control unit 24 includes an acquisition unit 241, a determination unit 242, a setting unit 243, a notification unit 244, and a communication control unit 245. Each of the blocks (acquisition unit 241 to communication control unit 245) included in the control unit 24 is a functional block indicating a function of the control unit 24. These functional blocks may be software blocks or hardware blocks. For example, each of the above-described functional blocks may be one software module realized by software (including microprogram), or may be one circuit block on a semiconductor chip (die). Obviously, each functional block may be one processor or one integrated circuit. A configuration method of the functional blocks is arbitrary. Note that the control unit 24 may be configured in functional units different from the above-described functional blocks. An operation of each of the blocks included in the control unit 24 will be described later in detail.

2-4. Configuration of Base Station Device (Infrastructure)

Next, a configuration of the base station device 30 will be described. The base station devices 30 is a wireless communication device that performs wireless communication with the terminal device 50. The base station devices 30 is, for example, a device that functions as a wireless base station, wireless relay station, wireless access point, or the like. Here, the base station device 30 may be an on-road base station device such as an RSU or may be an optical extension device such as an RRH. As described above, the base station device 30 is a device included in an infrastructure in the V2I communication.

Figure 15:
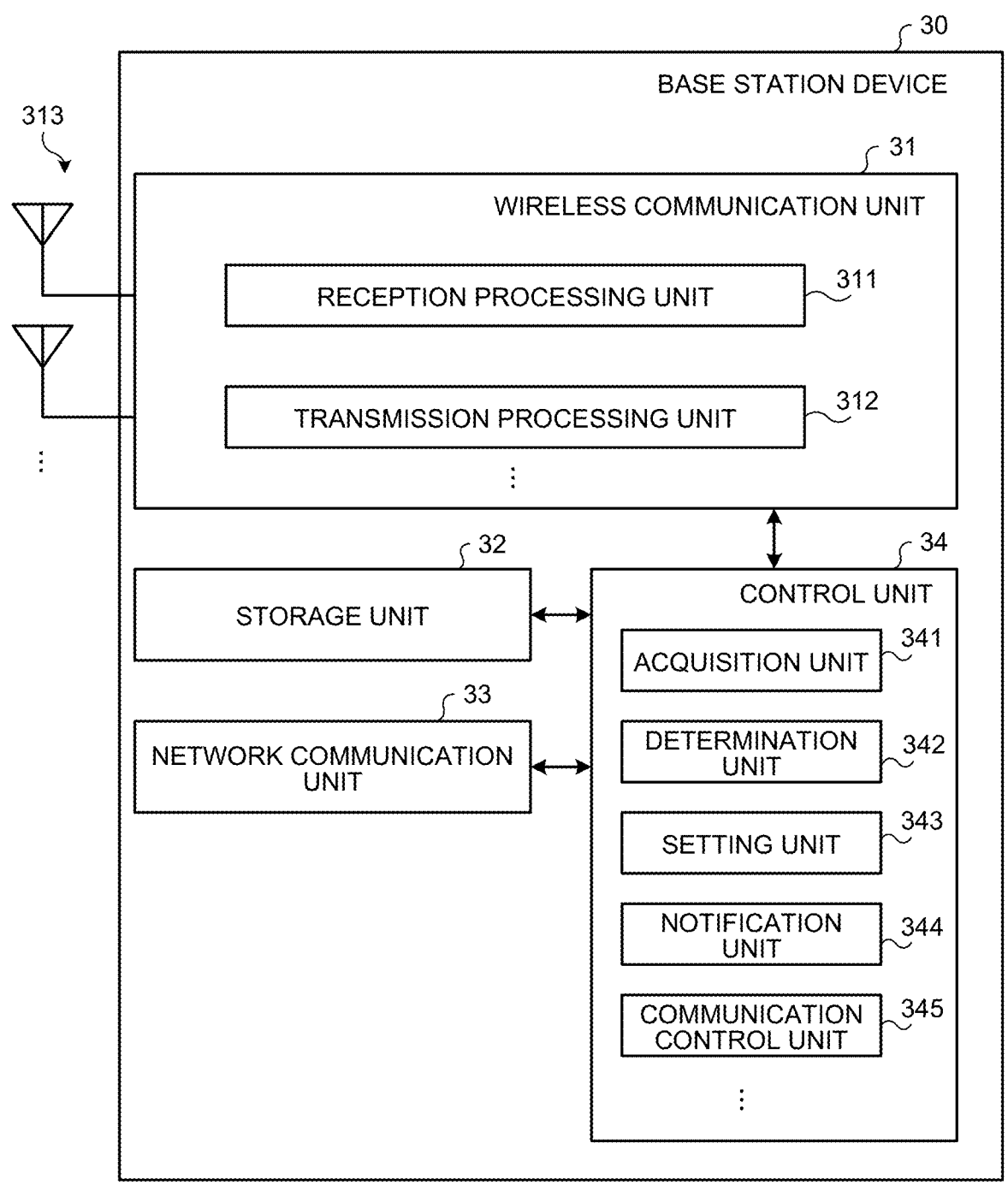
FIG. 15 is a view illustrating a configuration example of the base station device according to the embodiment of the present disclosure.

FIG. 15 is a view illustrating a configuration example of the base station device 30 according to the embodiment of the present disclosure. The base station device 30 includes a wireless communication unit 31, a storage unit 32, a network communication unit 33, and a control unit 34. Note that the configuration illustrated in FIG. 15 is a functional configuration, and a hardware configuration may be different therefrom. Furthermore, functions of the base station device 30 may be implemented in a manner of being distributed in a plurality of physically separated configurations.

The wireless communication unit 31 is a wireless communication interface that wirelessly communicates with other wireless communication devices (such as terminal device 50, base station device 20, and another base station device 30). The wireless communication unit 31 operates under the control of the control unit 34. The wireless communication unit 31 includes a reception processing unit 311, a transmission processing unit 312, and an antenna 313. The configuration of the wireless communication unit 31 (reception processing unit 311, transmission processing unit 312, and antenna 313) is similar to that of the wireless communication unit 21 (reception processing unit 211, transmission processing unit 212, and antenna 213) of the base station device 20.

The storage unit 32 is a storage device on which reading and writing of data can be performed, such as a DRAM, SRAM, flash memory, or hard disk. The storage unit 32 functions as a storage means of the base station device 30. The configuration of the storage unit 32 is similar to that of the storage unit 22 of the base station device 20.

The network communication unit 33 is a communication interface for communicating with other devices (such as management device 10, base station device 20, another base station device 30, and cloud server device CS). The network communication unit 33 has a function of being directly or indirectly connected to the network N1. For example, the network communication unit 33 includes a LAN interface such as an NIC. Furthermore, the network communication unit 33 may be a wired interface or a wireless interface. The network communication unit 33 functions as a network communication means of the base station device 30. The configuration of the network communication unit 33 is similar to that of the network communication unit 23 of the base station device 20.

The control unit 34 is a controller that controls each unit of the base station device 30. The control unit 34 is realized by, for example, a processor such as a CPU or an MPU. For example, the control unit 34 is realized by the processor executing various programs stored in the storage device inside the base station device 30 by using a RAM or the like as a work area. Note that the control unit 34 may be realized by an integrated circuit such as an ASIC or FPGA. Each of the CPU, MPU, ASIC, and FPGA can be regarded as a controller.

As illustrated in FIG. 15, the control unit 34 includes an acquisition unit 341, a determination unit 342, a setting unit 343, a notification unit 344, and a communication control unit 345. Each of the blocks (acquisition unit 341 to communication control unit 345) included in the control unit 34 is a functional block indicating a function of the control unit 34. These functional blocks may be software blocks or hardware blocks. For example, each of the above-described functional blocks may be one software module realized by software (including microprogram), or may be one circuit block on a semiconductor chip (die). Obviously, each functional block may be one processor or one integrated circuit. A configuration method of the functional blocks is arbitrary. Note that the control unit 34 may be configured in functional units different from the above-described functional blocks. An operation of each of the block of the control unit 34 may be similar to the operation of each of the blocks (acquisition unit 241 to the communication control unit 245) of the control unit 24. The description of the acquisition unit 341 to the communication control unit 345 appearing in the following description can be replaced with the acquisition unit 241 to the communication control unit 245 as appropriate.

2-5. Configuration of Terminal Device

Next, a configuration of the terminal device 50 will be described. The terminal device 50 is a movable wireless communication device. For example, the terminal device 50 is a vehicle such as an automobile, or a wireless communication device mounted on the vehicle. The terminal device 50 may be a movable terminal device such as a cellular phone or smart device. The terminal device 50 can wirelessly communicate with the base station device 20 and the base station device 30. Furthermore, the terminal device 50 can perform sidelink communication with another terminal device 50.

Figure 16:
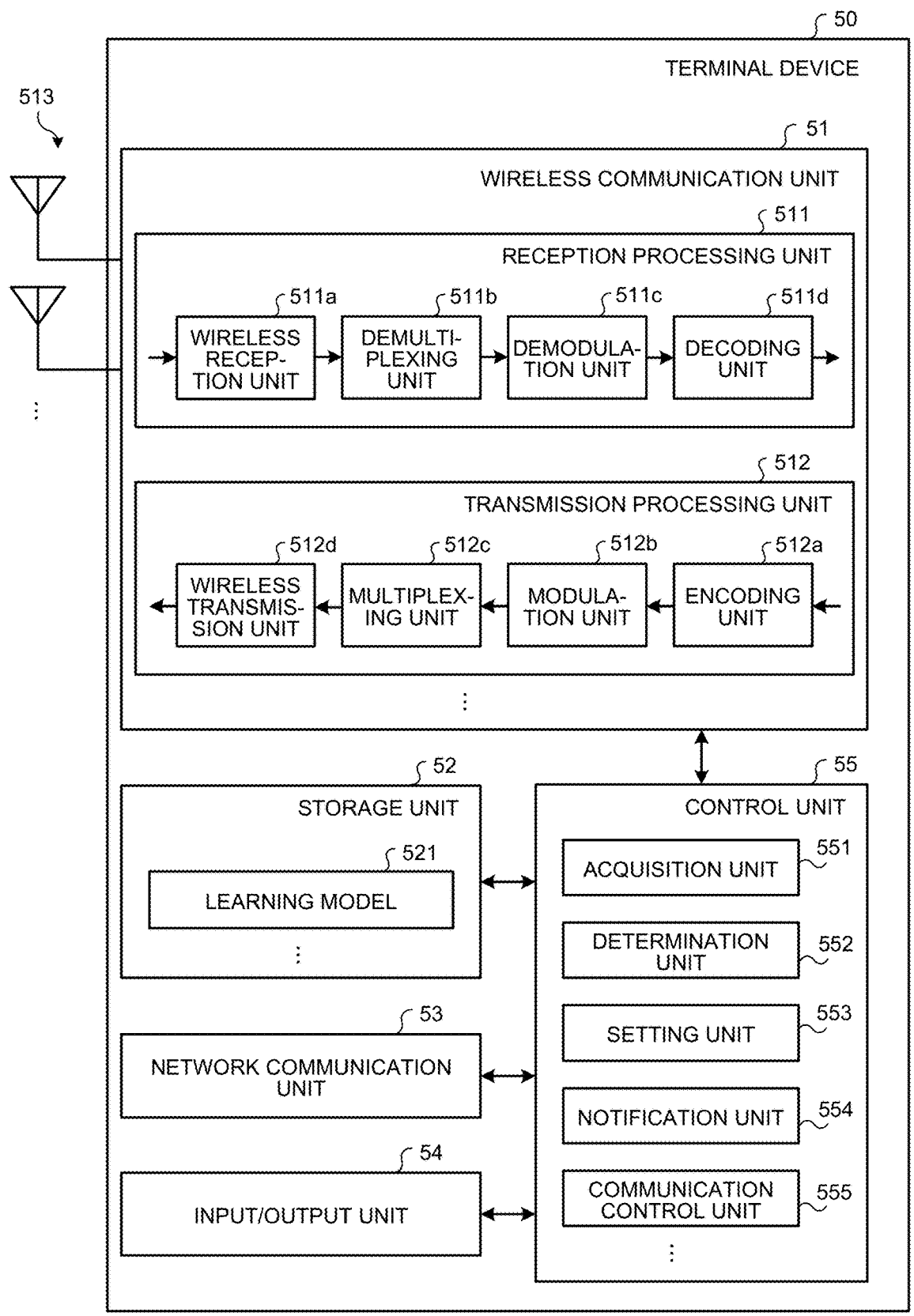
FIG. 16 is a view illustrating a configuration example of a terminal device according to the embodiment of the present disclosure.

FIG. 16 is a view illustrating a configuration example of the terminal device 50 according to the embodiment of the present disclosure. The terminal device 50 includes a wireless communication unit 51, a storage unit 52, a network communication unit 53, an input/output unit 54, and a control unit 55. Note that the configuration illustrated in FIG. 16 is a functional configuration, and a hardware configuration may be different therefrom. Furthermore, functions of the terminal device 50 may be implemented in a manner of being distributed in a plurality of physically separated configurations.

The wireless communication unit 51 is a wireless communication interface that wirelessly communicates with other wireless communication devices (such as base station device 20 and base station device 30). The wireless communication unit 51 operates under the control of the control unit 55. The wireless communication unit 51 is compatible with one or a plurality of radio access methods. For example, the wireless communication unit 51 is compatible with both NR and LTE. The wireless communication unit 51 may be compatible with W-CDMA and cdma2000 in addition to NR and LTE. Furthermore, the wireless communication unit 51 is compatible with communication using non-orthogonal multiple access (NOMA).

The wireless communication unit 51 includes a reception processing unit 511, a transmission processing unit 512, and an antenna 513. The wireless communication unit 51 may include a plurality of the reception processing units 511, a plurality of the transmission processing units 512, and a plurality of the antennas 513. Note that in a case where the wireless communication unit 51 is compatible with the plurality of radio access methods, each unit of the wireless communication unit 51 may be configured individually for each of the radio access methods. For example, the reception processing unit 511 and the transmission processing unit 512 may be individually configured for LTE and NR.

The reception processing unit 511 processes a downlink signal received via the antenna 513. The reception processing unit 511 includes a wireless reception unit 511a, a demultiplexing unit 511b, a demodulation unit 511c, and a decoding unit 511d.

The wireless reception unit 511a performs down-conversion, a removal of an unnecessary frequency component, control of an amplification level, a quadrature demodulation, conversion into a digital signal, a removal of a guard interval, an extraction of a frequency domain signal by fast Fourier transform, and the like on the downlink signal. The demultiplexing unit 511b demultiplexes a downlink channel, downlink synchronization signal, and downlink reference signal from a signal output from the wireless reception unit 511a. The downlink channel is, for example, a channel such as a physical broadcast channel (PBCH), a physical downlink shared channel (PDSCH), or a physical downlink control channel (PDCCH). The demodulation unit 211c demodulates a received signal by using a modulation method such as BPSK, QPSK, 16-QAM, 64-QAM, or 256-QAM with respect to a modulation symbol of the downlink channel. The decoding unit 511d performs decoding processing on demodulated encoded bit of the downlink channel. The decoded downlink data and downlink control information are output to the control unit 55.

The transmission processing unit 512 performs transmission processing of uplink control information and uplink data. The transmission processing unit 512 includes an encoding unit 512a, a modulation unit 512b, a multiplexing unit 512c, and a wireless transmission unit 512d.

The encoding unit 512a encodes the uplink control information and uplink data input from the control unit 55 by using an encoding method such as block encoding, convolutional encoding, turbo encoding, or the like. The modulation unit 512b modulates encoded bits output from the encoding unit 512a by a predetermined modulation method such as BPSK, QPSK, 16-QAM, 64-QAM, or 256-QAM. The multiplexing unit 512c multiplexes a modulation symbol of each channel and an uplink reference signal, and performs an arrangement thereof in a predetermined resource element. The wireless transmission unit 512d performs various kinds of signal processing on a signal from the multiplexing unit 512c. For example, the wireless transmission unit 512d performs processing such as conversion into a time domain by inverse fast Fourier transform, addition of a guard interval, generation of a baseband digital signal, conversion into an analog signal, a quadrature modulation, up-conversion, a removal of an extra frequency component, and power amplification. A signal generated by the transmission processing unit 512 is transmitted from the antenna 513.

The storage unit 52 is a storage device on which reading and writing of data can be performed, such as a DRAM, SRAM, flash memory, or hard disk. The storage unit 52 functions as a storage means of the terminal device 50. The storage unit 52 stores a learning model 521 and the like. The learning model 521 corresponds to the learning model 121 generated in the management device 10 and notified to the terminal device 50. A series of operations that is related to the ML basis and that uses the learning model 521 will be described later.

The network communication unit 53 is a communication interface for communicating with other devices. For example, the network communication unit 53 is a LAN interface such as an NIC. The network communication unit 53 has a function of being directly or indirectly connected to the network N1. The network communication unit 53 may be a wired interface or a wireless interface. The network communication unit 53 functions as a network communication means of the terminal device 50. The network communication unit 53 communicates with other devices under the control of the control unit 55.

The input/output unit 54 is a user interface for exchanging information with a user. For example, the input/output unit 54 is an operation device for the user to perform various operations, such as a keyboard, mouse, operation key, and touch panel. Alternatively, the input/output unit 54 is a display device such as a liquid crystal display or an organic electroluminescence display (organic EL display). The input/output unit 54 may be an acoustic device such as a speaker or buzzer. Furthermore, the input/output unit 54 may be a lighting device such as a light emitting diode (LED) lamp. The input/output unit 54 functions as an input/output means (input means, output means, operation means, or notification means) of the terminal device 50.

The control unit 55 is a controller that controls each unit of the terminal device 50. The control unit 55 is realized by, for example, a processor such as a CPU or an MPU. For example, the control unit 55 is realized by the processor executing various programs stored in the storage device inside the terminal device 50 by using a RAM or the like as a work area. Note that the control unit 55 may be realized by an integrated circuit such as an ASIC or FPGA. Each of the CPU, MPU, ASIC, and FPGA can be regarded as a controller.

As illustrated in FIG. 16, the control unit 55 includes an acquisition unit 551, a determination unit 552, a setting unit 553, a notification unit 554, and a communication control unit 555. Each of the blocks (acquisition unit 551 to communication control unit 555) included in the control unit 55 is a functional block indicating a function of the control unit 55. These functional blocks may be software blocks or hardware blocks. For example, each of the above-described functional blocks may be one software module realized by software (including microprogram), or may be one circuit block on a semiconductor chip (die). Obviously, each functional block may be one processor or one integrated circuit. A configuration method of the functional blocks is arbitrary. Note that the control unit 55 may be configured in functional units different from the above-described functional blocks. An operation of each of the blocks included in the control unit 55 will be described later in detail.

Note that an outline of operations of the determination unit 552 and the setting unit 553 is described first. The determination unit 552 determines a mode to be used among a Measurement-based mode, an ML mode, and a Hybrid mode on the basis of information that is related to a communication environment and that includes positional information related to a current position. The information related to the communication environment indicates information such as a current propagation environment, and also includes information in which a change in the propagation environment over a predetermined period is accumulated, and the like. The setting unit 553 resets terminal-side setting information according to a determined mode that is determined by the determination unit 552, and sets a wireless communication parameter in the corresponding mode.

Furthermore, an operation of the determination unit 552 is similar to those of the determination units 242 and 342 of the base station devices 20 and 30. Thus, the description of the determination unit 552 appearing in the following description can be replaced with the determination units 242 and 342 as appropriate. On the other hand, the description of the determination units 242 and 342 appearing in the following description can be replaced with the determination unit 552 as appropriate.

Furthermore, the terminal device 50 may have a moving function. For example, the terminal device 50 may have a power unit such as an engine, and be movable by own power. Note that the terminal device 50 does not necessarily have the moving function. In this case, the terminal device 50 may be a device retrofitted to a device having the moving function (for example, vehicle such as automobile). For example, the terminal device 50 may be a navigation system device retrofitted to the automobile.

3. OPERATION OF INFORMATION PROCESSING SYSTEM

Next, an operation of the information processing system 1 will be described. Note that description of the "base station device 30" in the following description can be replaced with the "base station device 20".

3-1. Execution Subject of Mode Switching Processing

As described above, the information processing device of the present embodiment has the three modes that are the Measurement-based mode, the ML-based mode, and the Hybrid mode, and can determine the wireless communication parameter in each mode. Here, the information processing device to be an execution subject of the mode switching processing to switch the modes may be the terminal device 50 or the base station device 30.

Figure 17:
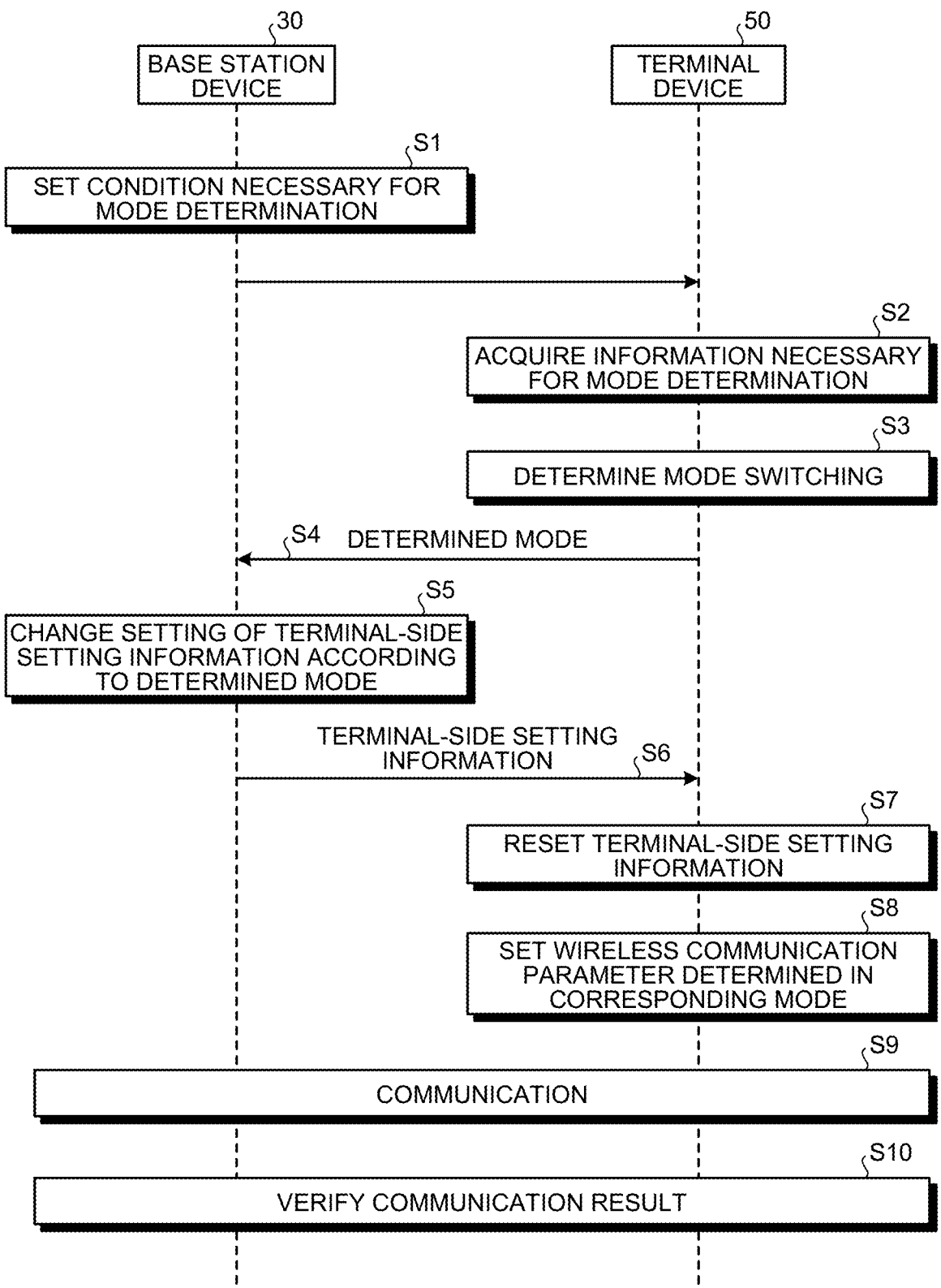
FIG. 17 is a processing sequence of a case where the terminal device is an execution subject of mode switching processing.

3-2. Case where Terminal Device is Execution Subject of Mode Switching Processing FIG. 17 is a processing sequence of a case where the terminal device 50 is the execution subject of the mode switching processing. In such a case, as illustrated in FIG. 17, the notification unit 344 of the base station device 30 notifies the terminal device 50 of condition setting necessary for mode determination (Step S1). Hereinafter, there is a case where a condition necessary for the mode determination is described as a "mode determination condition". The setting of the mode determination condition may be provided from the base station device 30, or may be set in the terminal device 50 in advance.

Then, the terminal device 50 determines the mode on the basis of the notified condition setting. Specifically, the acquisition unit 551 acquires various kinds of information used for the notified condition setting, that is, information necessary for the mode determination (Step S2).

Then, the determination unit 552 of the terminal device 50 performs mode switching determination on the basis of the acquired information and mode determination condition (Step S3). After the mode is determined by the determination, the notification unit 554 of the terminal device 50 notifies the base station device 30 of the determined mode (Step S4).

When receiving such notification, the base station device 30 changes the setting of the setting information related to the wireless communication parameter on a side of the terminal device 50 according to the determined mode (Step S5). Then, the notification unit 344 notifies the terminal device 50 of the setting information (Step S6).

When receiving such notification, the setting unit 553 of the terminal device 50 resets the terminal-side setting information (Step S7), and sets the wireless communication parameter, which is determined in the corresponding mode, after the resetting (Step S8).

Then, the communication control unit 555 performs communication with the set wireless communication parameter (Step S9). After the communication is performed, the base station device 30 and/or the terminal device 50 verifies a result of the communication (Step S10). A result of the verification may be used to change a mode determination condition in and after subsequent communication, setting information related to determination of the wireless communication parameter, and the like.

All the exchanges between the base station and the terminal are performed via signaling between the base station and the terminal, such as RRC signaling.

Figure 18:
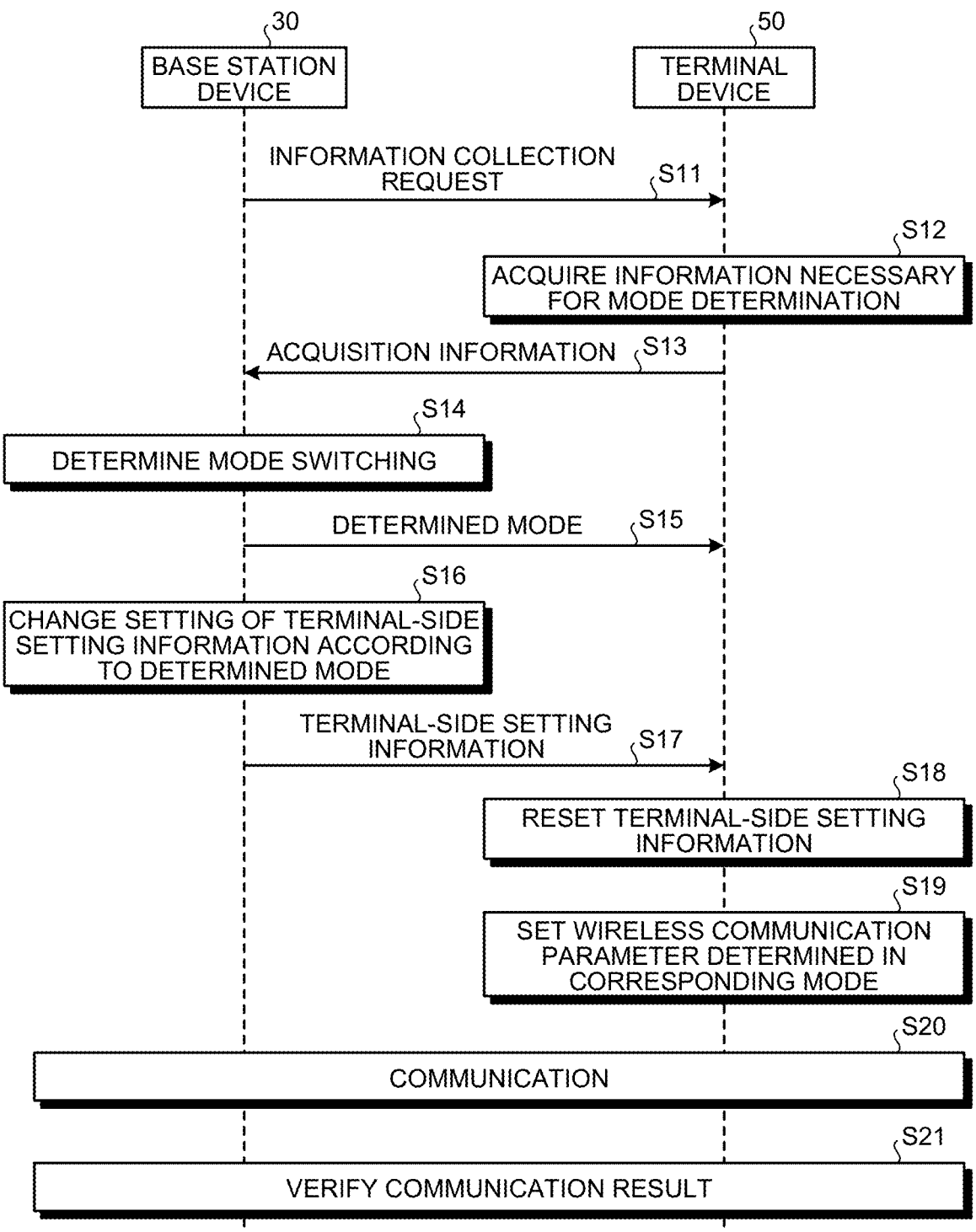
FIG. 18 is a processing sequence of a case where the base station device is the execution subject of mode switching processing.

3-3. Case where Base Station Device is Execution Subject of Mode Switching Processing FIG. 18 is a processing sequence of a case where the base station device 30 is the execution subject of the mode switching processing. In such a case, as illustrated in FIG. 18, the notification unit 344 of the base station device 30 notifies the terminal device 50 of an information collection request for collecting information necessary for the mode determination (Step S11).

Then, the terminal device 50 acquires the information necessary for the mode determination according to the notified information collection request (Step S12).

Then, the notification unit 554 of the terminal device 50 notifies the base station device 30 of the acquired acquisition information (Step S13). The determination unit 342 of the base station device 30 performs mode switching determination on the basis of the acquisition information (Step S14). After the mode is determined by the determination, the notification unit 344 of the base station device 30 notifies the terminal device 50 of the determined mode (Step S15).

After the notification, the base station device 30 changes the setting of the setting information related to the wireless communication parameter on the side of the terminal device 50 according to the determined mode (Step S16). Then, the notification unit 344 notifies the terminal device 50 of the setting information (Step S17).

When receiving such notification, the setting unit 553 of the terminal device 50 resets the terminal-side setting information (Step S18), and sets the wireless communication parameter, which is determined in the corresponding mode, after the resetting (Step S19).

Then, the communication control unit 555 performs communication with the set wireless communication parameter (Step S20). After the communication is performed, the base station device 30 and/or the terminal device 50 verifies a result of the communication (Step S21). A result of the verification may be used to change a mode determination condition in and after subsequent communication, setting information related to determination of the wireless communication parameter, and the like.

All the exchanges between the base station and the terminal are performed via signaling between the base station and the terminal, such as RRC signaling.

3-4. Collection of Information Necessary for Mode Determination

Next, above-described collection of the information necessary for the mode determination will be described. FIG. 19 is a view illustrating an example of the information necessary for the mode determination.

For the mode determination, for example, the base station device 30 can transmit a request signal (corresponding to information collection request described above) to the terminal device 50 in such a manner that one or more pieces of information illustrated in FIG. 19 are acquired and notification thereof is performed. The request signal may include designation of a parameter indicating which information is to be transmitted back, and an instruction of a quantization level of feedback information, or the like.

In addition, the terminal device 50 can acquire one or more pieces of information illustrated in FIG. 19 by itself and perform the mode determination on the basis of a mode determination condition set from the base station device 30 in advance.

By preparing a plurality of modes and switching the modes on the basis of the mode determination condition in such a manner, it is possible to contribute to achieving both efficient communication with less overhead and highly reliable communication. For example, when the ML-based mode is used and stops functioning well, it becomes possible to perform switching to another mode such as the Measurement basis by performing the mode switching determination. By using the plurality of modes in such a manner, even in a case where a problem is generated in the operation by any chance, it becomes possible to secure communication quality at least by performing fallback to a conventional mode, for example.

Incidentally, "information related to a terminal", "information related to a base station", "information related to a used band", and "others" are provided as information categories and an example of information for each category is illustrated in FIG. 19. Some examples indicating how the determination units 342 and 552 determine the mode by using these will be described.

For example, in a case where it is determined that a fluctuation state of communication is easily predicted on the basis of the information related to the communication environment, the determination units 342 and 552 determine to use at least the ML-based mode. Here, the information related to the communication environment includes positional information related to a current position (such as "terminal position information" of "information related to a terminal") and a 3D map, and the determination units 342 and 552 can determine whether the fluctuation state is easily predicted on the basis thereof.

Specifically, it can be said that a place where a fluctuation of the wireless communication is predicted to be large is not suitable for the ML-based mode. Thus, the determination units 342 and 552 perform the determination with weighting indicating that a place that has many intersections or that is heavily undulated is not suitable for the ML-based mode.

On the other hand, for example, since an expressway or the like is a place where the fluctuation is predicted to be moderate, the determination units 342 and 552 perform the determination with weighting indicating that the place is suitable for at least the ML-based mode.

Furthermore, for example, in a case where it is determined that the communication overhead is large, the determination units 342 and 552 determine to use at least the ML-based mode. In such a case, for example, an "overhead rate" of the "others" can be used as a determination material.

Furthermore, for example, in a case where it is determined that a degree of importance of communication is high, the determination units 342 and 552 at least determine to use not only the ML-based mode. In such a case, for example, a "packet priority" of the "others" can be used as a determination material.

Furthermore, for example, in a case where it is determined that disturbance is large, the determination units 342 and 552 at least determine to use not only the ML-based mode. In such a case, for example, "radio wave reflectance" in "vehicle body information" of the "others" can be used as a determination material.

Furthermore, for example, the information related to the communication environment includes information related to a predetermined surrounding area, and the determination units 342 and 552 determine whether to use the ML-based mode on the basis of a selection probability of beamforming of a case where the ML-based mode is used, the probability being associated with each area.

In such a case, for example, "area information" of the "information related to a terminal" is a determination material. The "area information" here may be, for example, area information using an appropriate beamforming selection probability or the like of a case where the ML-based mode is used. As appropriate beamforming, for example, a selection probability of a beamforming index in a range of top xdB among selectable beam gains can be used. In addition, the determination may be made, for example, on the basis of whether the beamforming index is in X beams from the top including the best performance (RSRP/RSRQ or the like), such as beams of the top xdB. An example of the map is illustrated in FIG. 20. FIG. 20 is a view illustrating an example of a map including the beamforming selection probability. In the example of FIG. 20, the map is a map indicating the beamforming selection probability for each of areas #1 to #9, and it can be understood that the area #4 has the highest beamforming selection probability, for example.

3-5. Execution Condition and the Like of Mode Switching Processing

As described above, the terminal device 50 or the base station device 30 executes the mode switching processing using the various kinds of information illustrated in FIG. 19 and FIG. 20. A criterion for the mode switching determination may be notified in advance from the base station device 30 to the terminal device 50, or may be set in the terminal device 50 in advance.

Figure 21:
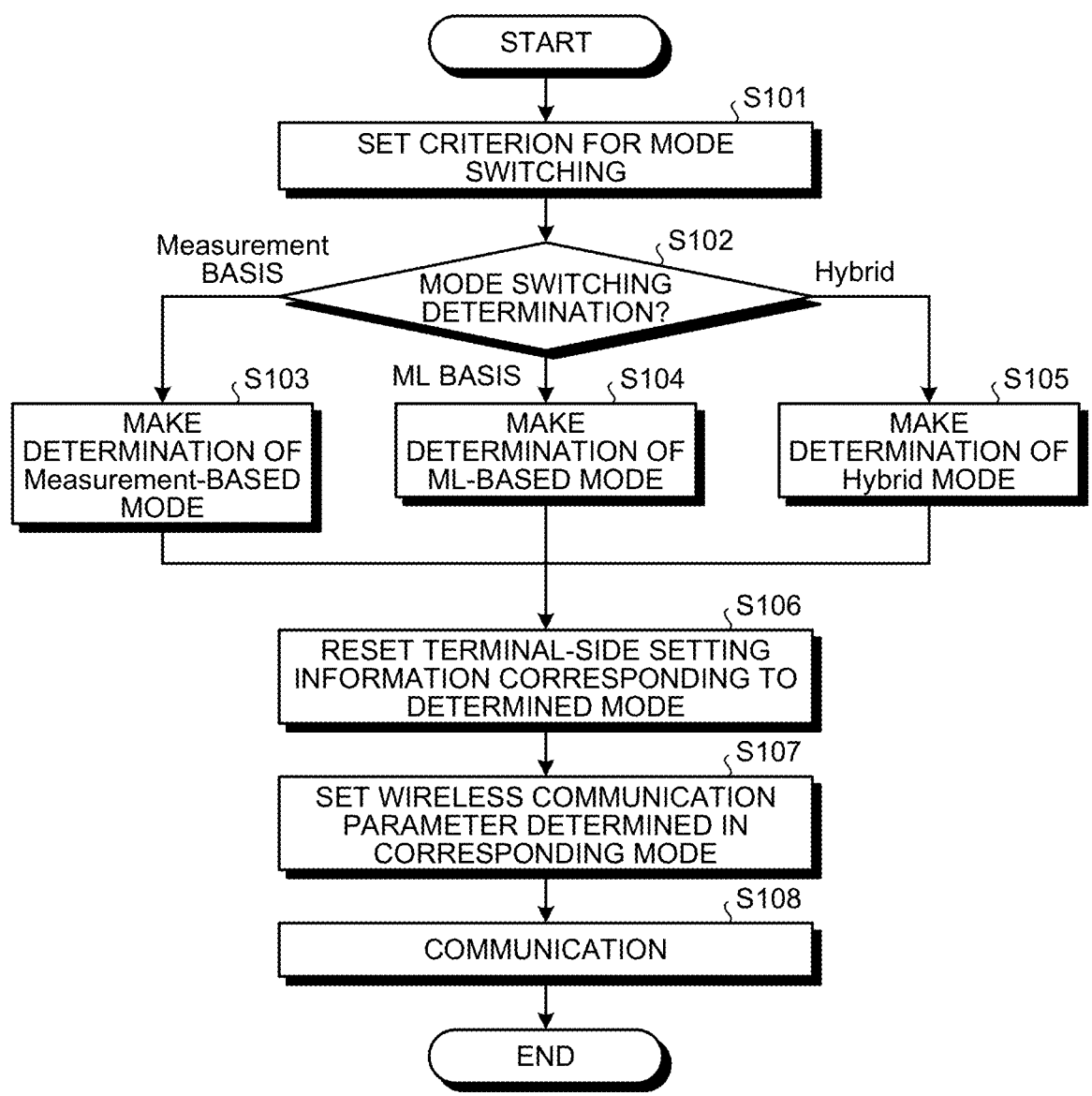
FIG. 21 is a flowchart illustrating a processing procedure of the mode switching processing executed by the terminal device.
Figure 22:
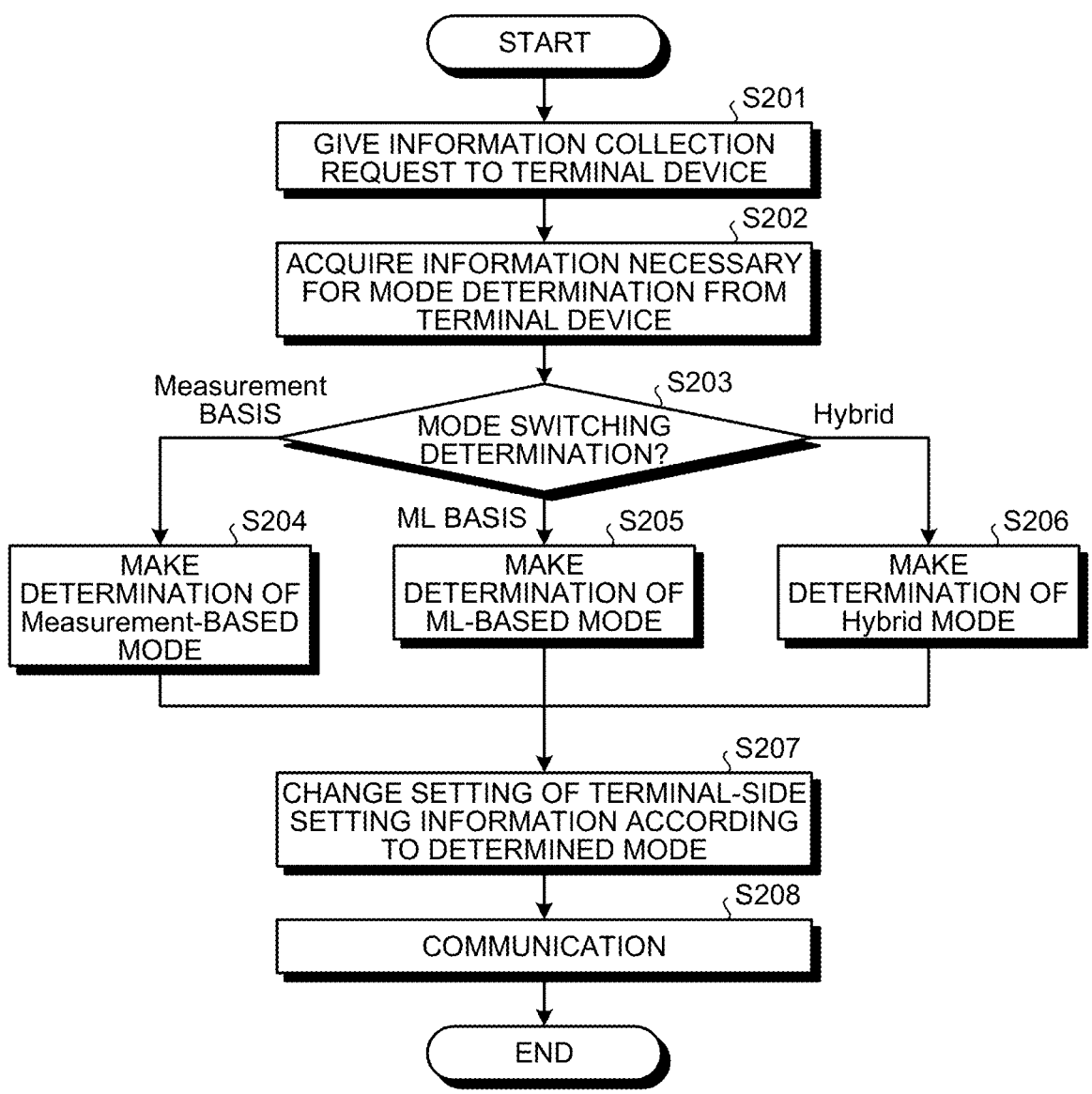
FIG. 22 is a flowchart illustrating a processing procedure of the mode switching processing executed by the base station device.

FIG. 21 is a flowchart illustrating a processing procedure of the mode switching processing executed by the terminal device 50. Furthermore, FIG. 22 is a flowchart illustrating a processing procedure of the mode switching processing executed by the base station device 30.

As illustrated in FIG. 21, in a case where the terminal device 50 executes the mode switching processing, the setting unit 553 first sets a criterion for mode switching (Step S101). Then, the determination unit 552 performs the mode switching determination on the basis of this (Step S102).

Here, when determination as the Measurement basis is made (Step S102, Measurement basis), the determination unit 552 determines the mode of determining a wireless communication parameter to be the Measurement-based mode (Step S103).

Furthermore, when determination as the ML basis is made (Step S102, ML basis), the determination unit 552 determines the mode of determining the wireless communication parameter to be the ML-based mode (Step S104).

Furthermore, when determination as the Hybrid is made (Step S102, Hybrid), the determination unit 552 determines the mode of determining the wireless communication parameter as the Hybrid mode (Step S105).

Then, the setting unit 553 resets terminal-side setting information corresponding to the determined mode (Step S106). Then, the setting unit 553 sets the wireless communication parameter determined in the corresponding mode (Step S107), and communication is performed with the set wireless communication parameter (Step S108).

Furthermore, as illustrated in FIG. 22, in a case where the base station device 30 executes the mode switching processing, the notification unit 344 first notifies the terminal device 50 of an information collection request (Step S201). Then, the acquisition unit 341 acquires information necessary for mode determination from the terminal device 50 (Step S202).

Then, the determination unit 342 performs the mode switching determination (Step S203). Here, when determination as the Measurement basis is made (Step S203, Measurement basis), the determination unit 342 determines the mode of determining the wireless communication parameter to be the Measurement-based mode (Step S204).

Furthermore, when determination as the ML basis is made (Step S203, ML basis), the determination unit 342 determines the mode of determining the wireless communication parameter to be the ML-based mode (Step S205).

Furthermore, when determination as the Hybrid is made (Step S203, Hybrid), the determination unit 342 determines the mode of determining the wireless communication parameter as the Hybrid mode (Step S206).

Then, the setting unit 343 changes setting of the terminal-side setting information according to the determined mode (Step S207), and causes the terminal device 50 to reset the terminal-side setting information and to set the wireless communication parameter determined in the corresponding mode. Then, communication is performed with the set wireless communication parameter (Step S208).

Note that such execution conditions of the mode switching processing can be set in a manner of (1) and (2) in the following according to granularity of switching time, for example.

(1) Static Switching

The Static switching is a case where there is no time change in the mode switching. A mode is determined after attachment to a specific cell, and the mode switching does not occur unless there is a change such as involving of a cell change. On the other hand, when a cell is switched or in a case where positional information is greatly changed, the mode switching occurs. For example, the mode switching also occurs depending on a place (such as freeway, hot spot, or connection destination cell change), time (such as day or night), a communication frequency band, and the like.

(2) Semi-Static Switching and Dynamic Switching

The Semi-static switching is a case where the time change of the mode switching is long, and a case where setting is not changed for a long period once the mode switching is set. In communication, a state in which there is no change of several hundred ms or more is considered, for example. Furthermore, the dynamic switching is assumed to be a case where the time change is short, and is a case where switching is performed in units of several ms, for example. For example, a case where switching to the ML-based mode is performed in a case where a link failure or beam failure is generated, a case where shifting to the Measurement-based mode is performed in a case where a similar problem is generated during communication on the ML basis, and the like are considered. Note that the switching may be based not only on a case where the Link failure or Beam failure is generated but also on a packet error rate, a communication verification result using ACK/NACK information or the like, a result of performance comparison between the ML basis and the Measurement basis, or the like.

3-6. Mode Determination Notification Between Base Station and Terminal

The base station device 30 notifies the terminal device 50 of the mode determination. At this time, the notification may be given in a manner of UE specific, or the notification may be given in units of UE groups (group specific). In addition, the same mode may be set in the entire cell (cell specific). The notification is given to the terminal device 50 by utilization of Unicast, Group cast, and Broadcast, respectively.

Furthermore, the base station device 30 may perform the mode determination on the basis of information acquired from a specific terminal device 50, and give the same mode notification to a terminal device 50 from which the information is not acquired. That is, the same mode setting may be performed for a certain predetermined group terminals or the entire cell on the basis of information from a representative terminal.

3-7. Operation in Each Mode

Next, the operation in each mode will be described more specifically.

[Measurement Basis]

In the Measurement basis, Measurement using a known signal, notification signal, and synchronization signal used in existing cellular communication and legacy wireless communication control using a result thereof are performed. Some examples of the control are illustrated in FIG. 23. FIG. 23 is a view illustrating a control example on the Measurement basis.

[ML Basis]

Figure 24:
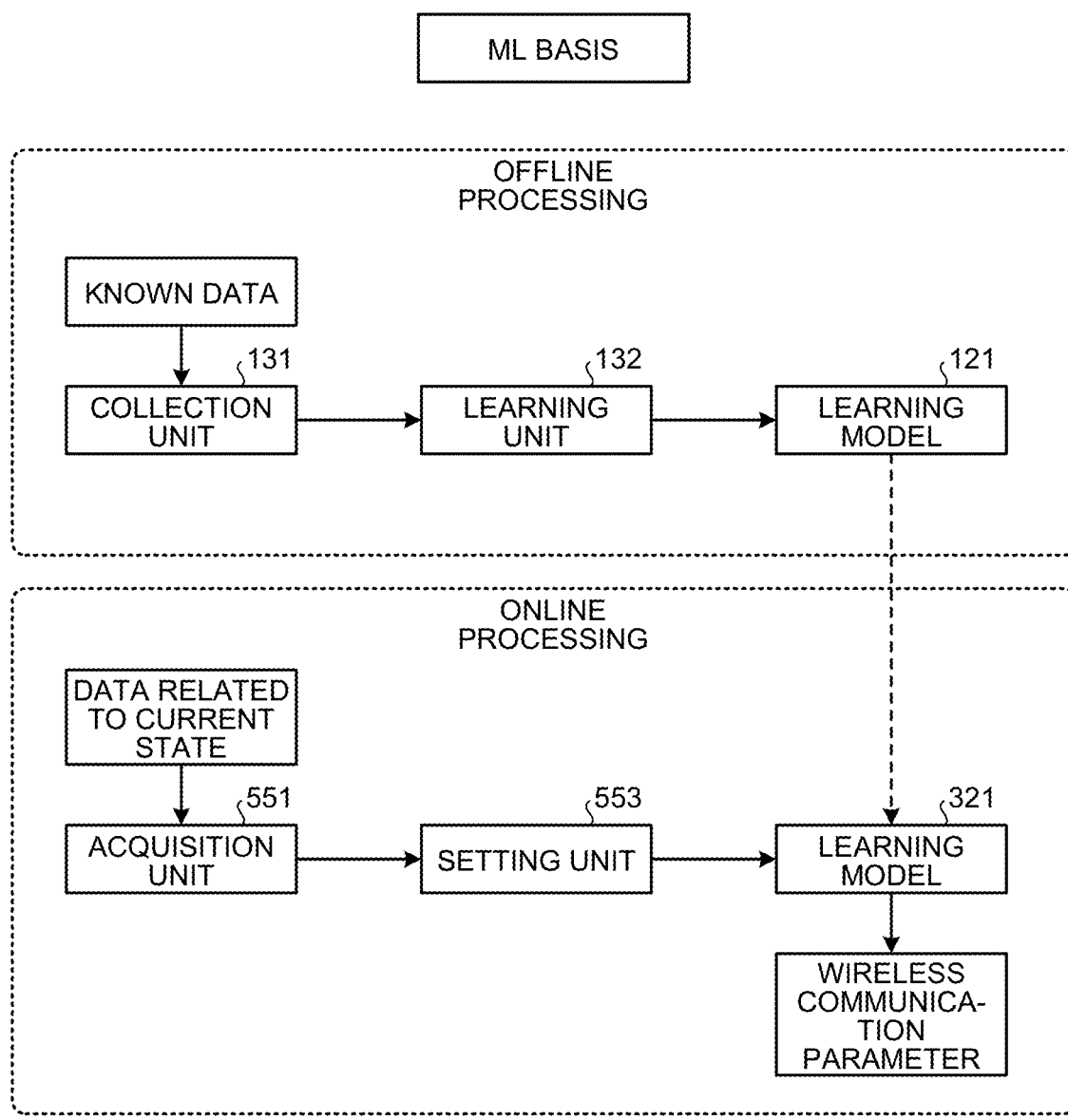
FIG. 24 is a view illustrating an overview of an ML basis.

FIG. 24 is a view illustrating an overview of the ML basis. Note that, here, the description will be made on the assumption that offline processing is performed by the management device 10 and online processing is performed between the base station device 30 and the terminal device 50. However, offline processing may be performed by the cloud server device CS. Furthermore, the offline processing may be performed by the base station device 30 or the terminal device 50.

First, in the offline processing, as illustrated in FIG. 24, the collection unit 131 collects known data including past one, and the learning unit 132 executes machine learning on the basis of the collected data. The learning unit 132 generates the learning model 121 as a learning result of the machine learning.

FIG. 25 is a view illustrating an example of information collected for the machine learning on the ML basis. Note that "information related to a terminal", "information related to a base station", "information related to a used band", and "information related to communication" are provided as information categories and an example of information for each category is illustrated in FIG. 25. The collection unit 131 collects one or more of the pieces of information from the known data, and sets the information as input data of the machine learning (training data set).

The learning unit 132 executes the machine learning on the basis of the input data, and generates the learning model 121 as a learning result thereof. The learning unit 132 generates the learning model 121 in such a manner that an optimal wireless communication parameter is output in a case where data related to a current state (described later) is input.

Figure 26:
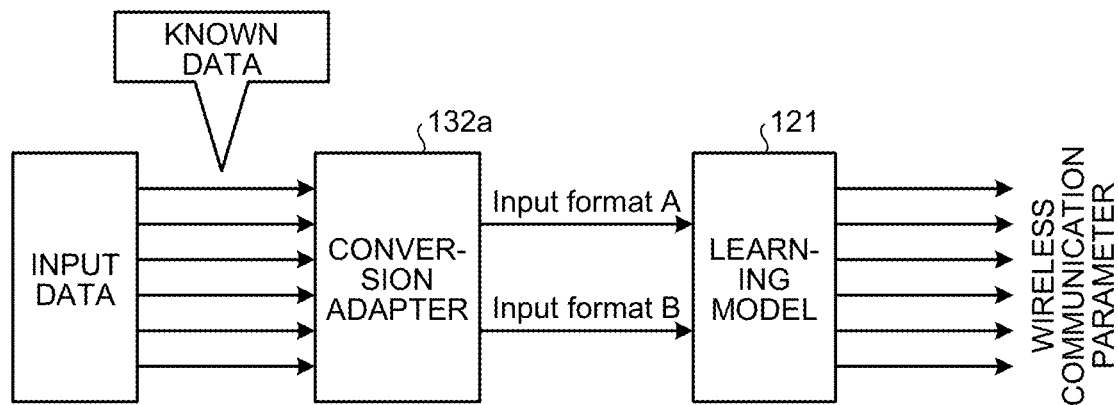
FIG. 26 is a view illustrating an example in which a conversion adapter is used as an intermediary.

Here, FIG. 26 is a view illustrating an example via a conversion adapter 132a. The learning unit 132 may include the conversion adapter 132a. The learning model 121 may include a plurality of models generated by utilization of different learning algorithms. In that case, the conversion adapter 132a can rewrite input data into a format corresponding to each algorithm in order to perform an input to a specific model, as illustrated in FIG. 26. Furthermore, the conversion adapter 132a can also be used when the terminal device 50 inputs the data related to the current state (described later) to the learning model 521.

In a case of being used in the terminal device 50, the conversion adapter 132a may be set as setting on a side of a wireless layer by RRC signaling or the like from the base station device 30 to the terminal device 50, or setting may be performed in an application layer. Configurations of the input and output of the conversion adapter 132a may be appropriately changed by signaling.

Figure 27:
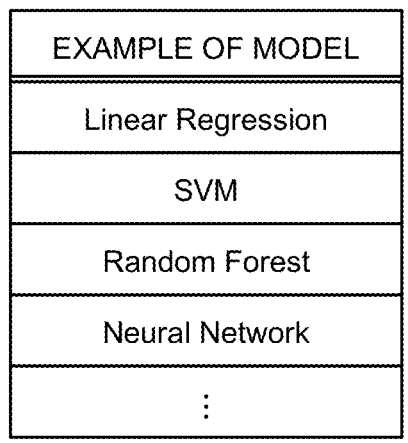
FIG. 27 is a view illustrating an example of a model used on the ML basis.

Note that FIG. 27 is a view illustrating an example of a model used on the ML basis. As illustrated in FIG. 27, on the ML basis, various models generated from different machine learning algorithms, such as linear regression, support vector machine (SVM), random forest, neural network, and the like can be used.

The description returns to FIG. 24. The learning model 121 generated by the learning unit 132 is notified to the base station device 30 as the learning model 321, for example. Installation into the base station device 30 as the learning model 321 may be performed in advance.

Then, in the online processing, the terminal device 50 determines an appropriate wireless communication parameter by using information, which is related to a communication environment and which includes positional information related to a current position, and the learning model 321. First, the acquisition unit 551 acquires data related to the current state. The data related to the current state here is an example of the "information related to a communication environment", and includes the data in the current state and in a predetermined period up to the current state. As the data related to the current state, for example, the "information related to a terminal", the "information related to a base station", the "information related to an environment", and the like in the example of the information illustrated in FIG. 25 are acquired.

Then, the setting unit 553 inputs the acquired data related to the current state to the learning model 321 of the base station device 30 online, receives an output value output from the learning model 321 online, and performs setting thereof as an appropriate wireless communication parameter.

Note that the terminal device 50 itself may input the data related to the current state to the learning model 521 offline, receive an output value output from the learning model 521 offline, and perform setting thereof as an appropriate wireless communication parameter. In such a case, it is necessary that the learning model 521 is distributed to or installed in the terminal device 50 in advance.

Figures 28, 29:
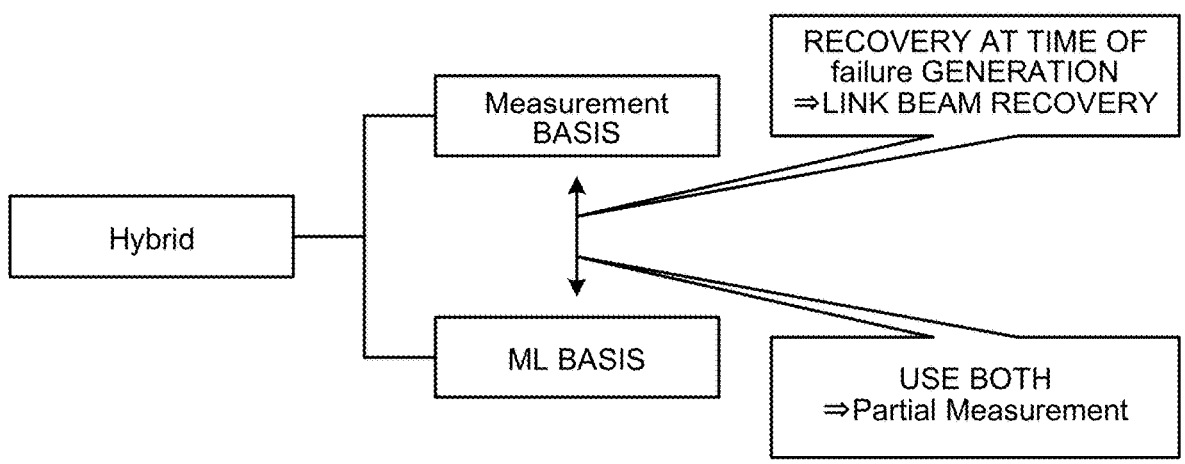
FIG. 28 is a view illustrating an example of a wireless communication parameter determined on the ML basis.
FIG. 29 is a view illustrating an outline of a Hybrid mode.

Here, an example of the wireless communication parameter set by the setting unit 553 will be described. FIG. 28 is a view illustrating an example of the wireless communication parameter set on the ML basis. As illustrated in FIG. 28, on the ML basis, the wireless communication parameter set on the Measurement basis that is basically a legacy is controlled.

[Hybrid]

FIG. 29 is a view illustrating an outline of the Hybrid mode. As illustrated in FIG. 29, in the Hybrid mode, the wireless communication parameter is determined by utilization of one or both of the determination results respectively by the Measurement basis and/or the ML basis.

In the Hybrid mode, for example, a link recovery can be performed in the other mode in a case where a communication link is lost in one of the modes of the Measurement basis and the ML basis, or more robust communication link can be held by utilization of the both modes. As illustrated in FIG. 29, a method of performing the link recovery in the other mode when failure is generated is hereinafter referred to as a "link beam recovery". In addition, a method of using the both modes will be hereinafter referred to as "Partial Measurement".

(1) Link Beam Recovery

The link beam recovery is a method of falling back to one of the Measurement-based and ML-based modes in a case where a link failure or beam failure is generated. There are two patterns that are a pattern of performing switching to the Measurement basis when communication is performed on the ML basis, and a pattern of performing switching to the ML basis when communication is performed on the Measurement basis.

That is, in the Hybrid mode, in a case where the link or beam is lost in one of the Measurement-based mode and the ML-based mode, the determination units 342 and 552 cause the fallback in the other mode.

When communication is performed on the ML basis, it is preferable to perform communication on the Measurement basis in a backend in preparation for a sudden link loss or the like. Such back-end Measurement may be set by RRC signaling or the like from the base station device 30 to the terminal device 50. The terminal device 50 performs the back-end Measurement at a specified frequency, and reconstructs the wireless communication parameter on the basis of a result of the last back-end Measurement when the ML-based communication link is lost. This enables quick backup.

Specifically, when the beam failure is generated, it is necessary to perform the beam recovery in a short time. Thus, it is desirable to perform the ML-based recovery by using a situation at the time of generation of the beam failure. For example, the ML-based wireless communication parameter setting may be performed by utilization of precoding information, a terminal traveling direction, AoA information, and the like used at the time of generation of the beam failure in addition to the terminal position information. In addition, in order to consider the capacity of the entire system, the ML-based wireless communication parameter setting may be performed by utilization of information such as a signal to leakage ratio (SLR) as an interference amount of a peripheral terminal.

Figure 30:
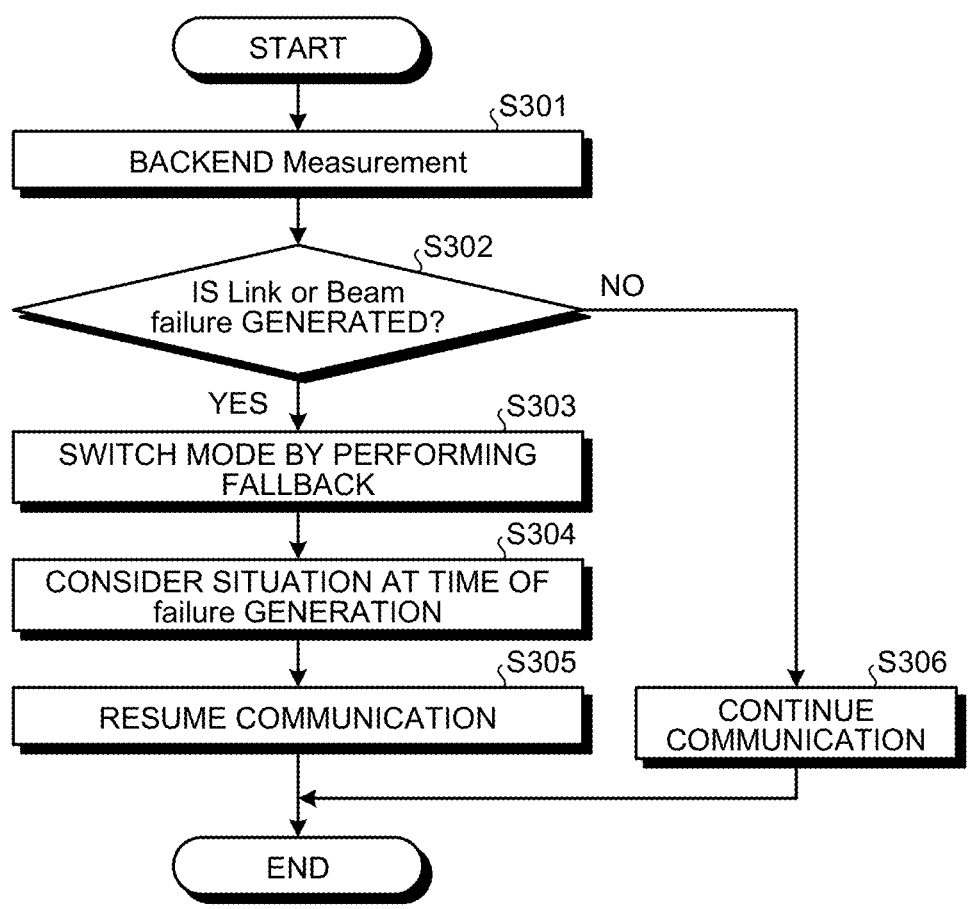
FIG. 30 is a flowchart illustrating a processing procedure of link beam recovery.

FIG. 30 is a flowchart illustrating a processing procedure of the link beam recovery. Here, it is assumed that communication is performed on the ML basis. As illustrated in FIG. 30, back-end Measurement is performed at a designated frequency (Step S301).

Then, it is assumed that the link failure or beam failure is generated (Step S302, Yes). Then, the terminal device 50 executes mode switching by performing fallback (Step S303). That is, the terminal device 50 reconstructs the wireless communication parameter on the basis of the result of the last back-end Measurement.

At this time, a situation at the time of generation of the failure is taken into consideration (Step S304). Note that such Step S304 may be optionally executed.

Then, the terminal device 50 resumes the communication (Step S305). When no failure is generated (Step S302, No), the communication is continued (Step S306).

(2) Partial Measurement

The Partial Measurement is a method of performing Measurement-based measurement to some extent in order to make the ML-based communication more robust. For example, while there is no measurement using a reference signal and zero overhead communication can be expected in a case where the ML-based communication is fully performed, the overhead is increased in a case where the Measurement-based communication is fully performed.

On the other hand, in the Partial Measurement, it becomes possible to perform communication while checking communication quality on the ML basis by performing Measurement-based measurement to some extent while performing the ML-based communication.

That is, in the Hybrid mode, the determination units 342 and 552 cause the Measurement-based mode to be used in intervals of the ML-based mode performed basically, and switch the ML-based mode to the Measurement-based mode when a degree of deviation in the communication quality between the two exceeds a predetermined threshold.

For example, it is assumed that YdB is acquired in a case where the Measurement-based communication is performed in a communication environment in which an SINR value is XdB on the ML basis. Here, when the deviation between X and Y is a predetermined value or larger and a result indicating that the communication quality is better on the Measurement basis is acquired, it cannot be said that the ML basis is appropriate. Thus, it is better to perform switching to the ML basis. In such a manner, it is possible to secure the communication quality by appropriately performing the Measurement-based quality checking of the communication link on the ML basis.

Figure 31:
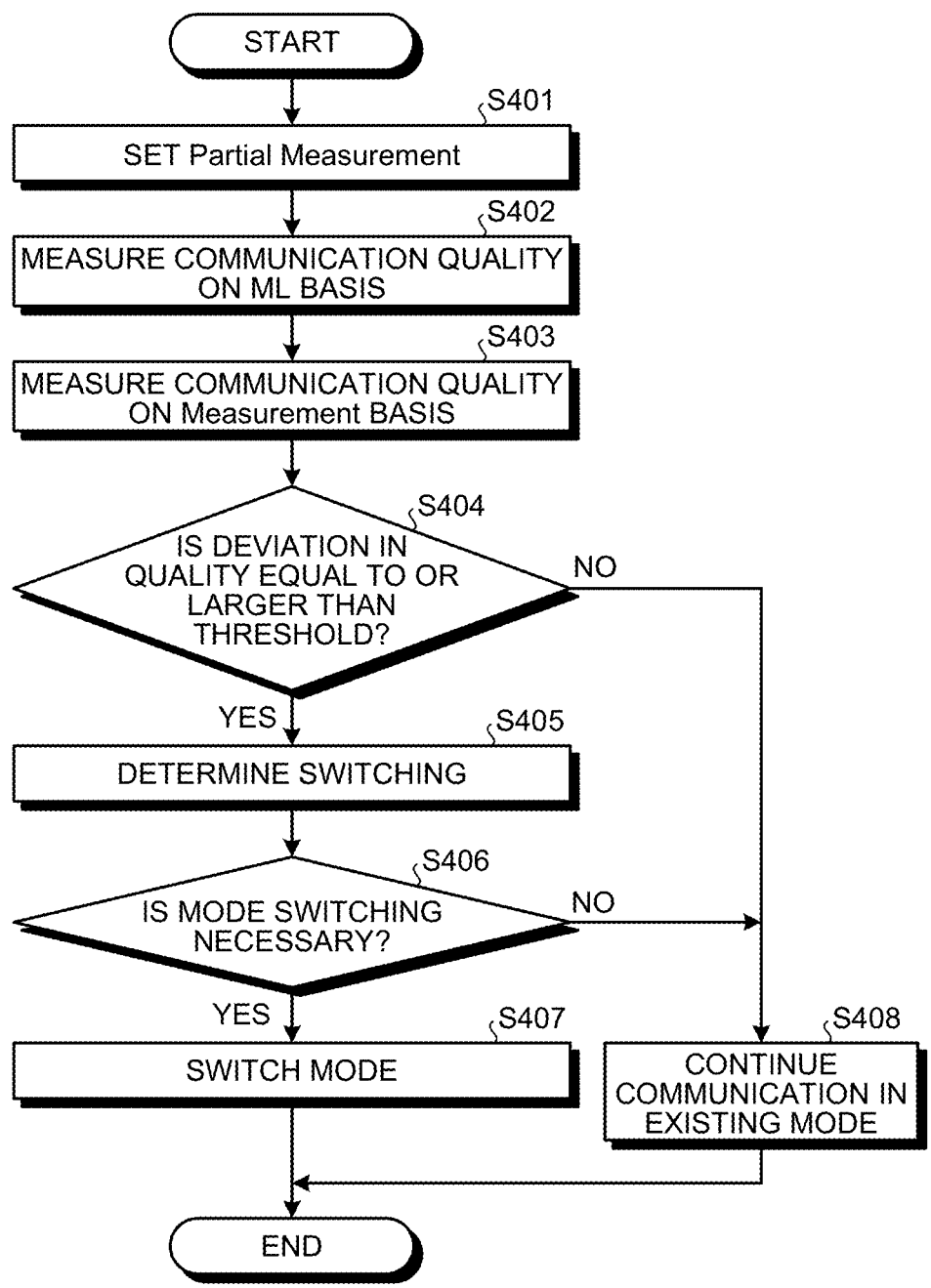
FIG. 31 is a flowchart illustrating a processing procedure of Partial Measurement.

FIG. 31 is a flowchart illustrating a processing procedure of the Partial Measurement. Here, it is assumed that communication is performed on the ML basis. As illustrated in FIG. 31, first, setting of the Partial Measurement is performed (Step S401).

Then, the communication quality on the ML basis is measured (Step S402). Furthermore, the communication quality on the Measurement basis is measured (Step S403).

Then, it is determined whether the deviation in quality is equal to or larger than a threshold (Step S404). Here, the deviation is equal to or larger than the threshold (Step S404, Yes), the mode switching determination is executed (Step S405). As a result, when the mode switching is necessary (Step S406, Yes), the mode switching is executed (Step S407). When the mode switching is not necessary (Step S406, No), the communication is continued in the existing mode (Step S408).

In addition, also in a case where the deviation in quality is smaller than the threshold (Step S406, No), the communication is continued in the existing mode (Step S408).

3-8. Change in Setting of Terminal-Side Setting Information According to Determined Mode Next, a change in the setting of the terminal-side setting information according to the determined mode will be described. This corresponds to Step S5 (FIG. 17) or Step S16 (FIG. 18) described above.

Such a setting change is performed, for example, by the setting unit 343 of the base station device 30. In the setting change, a frequency of measurement using a reference signal, reporting, and the like may be changed according to the determined mode that is determined. For example, in a case where the determined mode is the ML-based mode, measurement is basically unnecessary, and thus the measurement and reporting may be disabled. On the other hand, in a case where the determined mode is the Measurement basis, the terminal-side setting information enabling the measurement and reporting is set by the base station device 30. In addition, in a case where the determined mode is Hybrid, the terminal-side setting information for reducing the frequency of measurement and reporting is set by the base station device 30.

3-9. Verification of Communication Result

Next, verification of a communication result will be described. This corresponds to Step S10 (FIG. 17) or Step S21 (FIG. 18) described above.

After the communication is performed, the base station device 30 and/or the terminal device 50 verifies the communication result. As a result of the verification, the base station device 30 and/or the terminal device 50 may change a mode determination condition in and after subsequent communication, setting information for communication parameter determination, and the like by using the verification result. In addition, learning of the mode switching determination may be performed by utilization of the verification result.

4. EXAMPLE

Next, a first example and a second example of the present embodiment will be described. Both relate to the ML basis. The first example will be described first.

4-1. First Example

Figure 32:
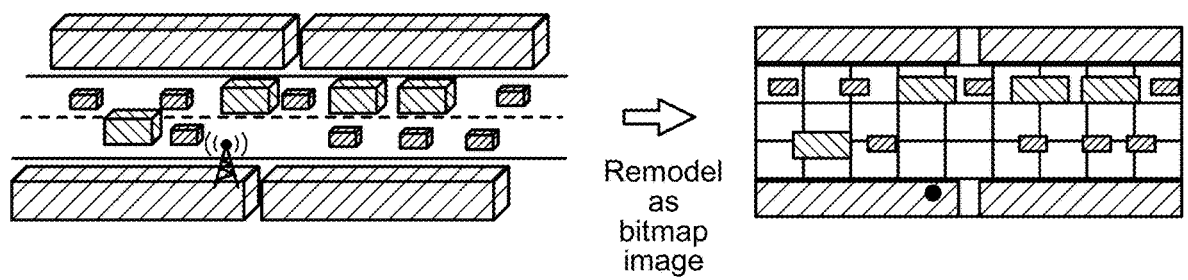
FIG. 32 is a view illustrating two-dimensional mapping of three-dimensional map information.
Figure 33:
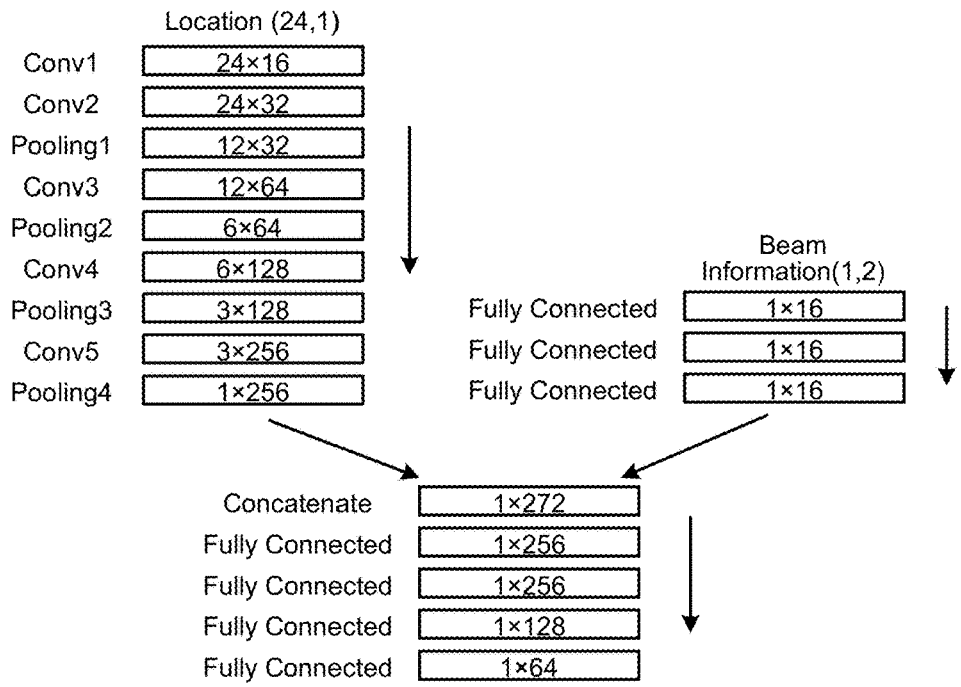
FIG. 33 is a view illustrating architecture of a two-branch CNN.
Figure 34:
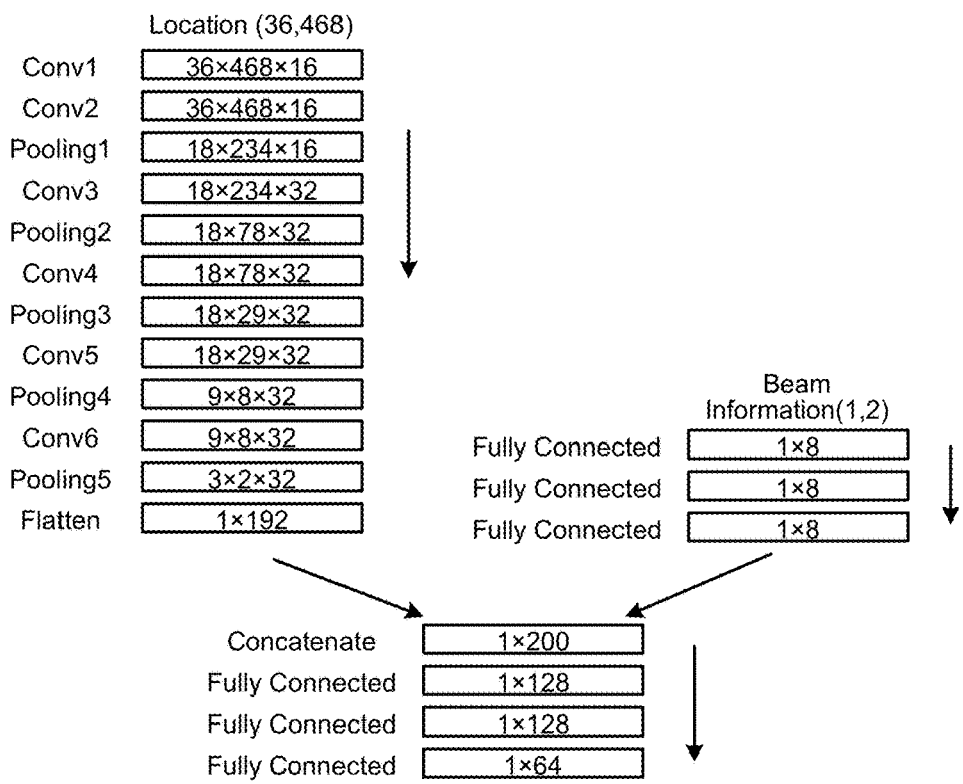
FIG. 34 is a view illustrating architecture of bitmap-based CNN.

FIG. 32 is a view illustrating two-dimensional mapping of three-dimensional map information. FIG. 33 is a view illustrating architecture of two-branch convolutional neural networks (CNN). FIG. 34 is a view illustrating architecture of bitmap-based CNN.

As the first example, predictive beam management using positional information is verified. This is to learn terminal position information and information related to beamforming, and to select a beamforming index, which is used for each piece of terminal position information, as a wireless communication parameter on the basis of a result of the learning.

As illustrated in FIG. 32, three-dimensional map information is converted into a two-dimensional bitmap and used as training data, and the two-branch CNN illustrated in FIG. 33 and the bitmap-based CNN illustrated in FIG. 34 are used as machine learning models. A performance comparison for each model is illustrated in Table 1 below. Note that results of cases where the random forest and the one-branch CNN are used are also illustrated in the table 1 for reference.

| Method | RMSE(dBm) | Accuracy |
|---|---|---|
| Random Forest | 3.7906 | 68.4% |
| One-Branch CNN without RSS for current beam | 2.4014 | 70.3% |
| Two-Branch CNN | 2.1747 | 73.1% |
| Bitmap-Based CNN | 2.2549 | 75.7% |

As illustrated in Table 1, according to the bitmap based CNN, it can be understood that a beam with the highest quality can be selected at a certain terminal position with a probability of 75.7% by utilization of only the positional information. Note that a selection probability does not need to be defined as a probability of selecting one with the highest quality, and it can be said that substantially high communication quality can be secured when the selection probability is defined as, for example, a probability of selecting one of top five beams, or the like.

In addition, a comparison has been made in a point whether positional information of only one terminal device 50 is used (Partial Location) or positional information of a surrounding environment is used together (Full Location) as a kind of the positional information. A result of the comparison is illustrated in Table 2 below.

| Method | RMSE(dBm) | Accuracy |
|---|---|---|
| Two-Branch CNN for Full Location | 2.1747 | 73.1% |
| Two-Branch CNN for Partical Location | 2.4154 | 66.4% |

According to Table 2, it can be understood that the selection probability is improved in a case of the Full Location as compared with a case of the Partial Location. Thus, in the learning of the beam selection, it can be said that it is desirable to acquire positional information of not only the own terminal but also the surrounding environment (such as information of a position of a surrounding vehicle, a vehicle body, a building, and a wall) by using, for example, a 3D map, a dynamic map, or the like and include the positional information in the training data. Next, a result of the comparison according to a difference in the number of antenna arrays is illustrated in Table 3 below.

| Array size | RMSE(dBm) | Accuracy |
|---|---|---|
| 4 × 2 | 1.5 | 74% |
| 8 × 2 | 1.6 | 63% |
| 16 × 2 | 2.1 | 60% |

According to Table 3, it can be understood that the beam selection probability deteriorates as an array size increases. Thus, it can be said that it is preferable to consider the number of antenna arrays as the mode determination condition for the ML basis.

4-2. Second Example

As the second example, predictive interference management using machine learning will be described. In this management, the ML-based beamforming completed between the base station and the terminal in the first example is developed to the entire system.

Specifically, beam strength is measured in each of the base station devices 20 and 30 and each terminal device 50, and a beam strength map (BSM) at a certain time point is created and learned, whereby optimization of beam allocation is performed in the entire system.

Figure 35:
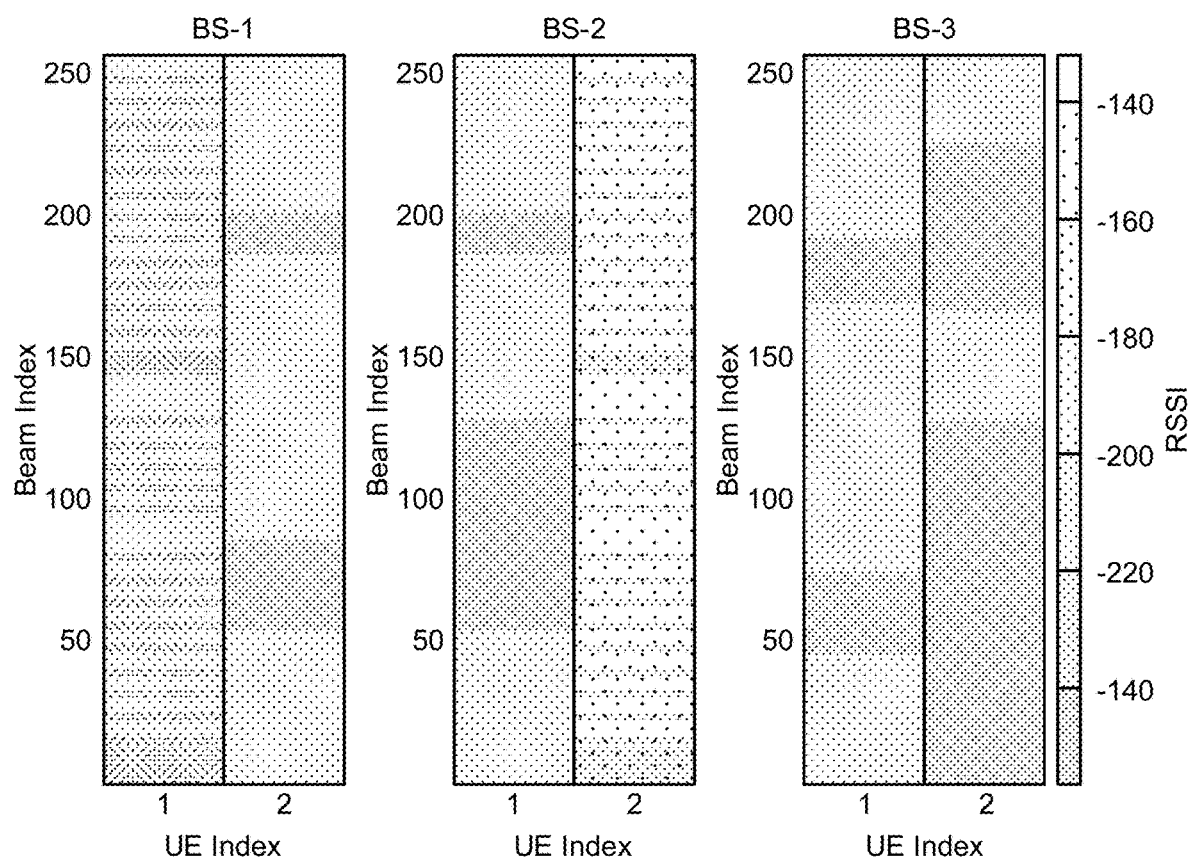
FIG. 35 is a view illustrating an example of creation of a BSM.

FIG. 35 is a view illustrating an example of creation of the BSM. Here, for example, the BSM is created in such a manner that 250 beams are distributed from a base station (BS)-1 to BS-3 to user equipment (UE)-1 and UE-2, respectively.

As a result, it becomes possible to consider interference from a specific base station device 30 to the terminal device 50 and to consider performance of the entire system.

Also, FIG. 36 is a view illustrating an example of an algorithm of machine learning using the BSM. As illustrated in FIG. 36, it can be understood that a signal to leakage ratio (SLR) is used as an index of interference in the algorithm. Note that the SLR here is a cumulative interference ratio of a transmission signal to a terminal other than the desired user terminal. At the time of performance of beamforming, for example, interference that is caused by a side lobe or the like and accumulated among a plurality of users is used.

By learning such a BSM, it becomes possible to predict from which base station device 30 to which terminal device 50 communication is to be performed and which beamforming index is to be used to improve performance of the entire system.

In addition, by executing machine learning in consideration of the SLR, it becomes possible to predict how much signal component can be provided to a target terminal device 50 and how much interference is given to a terminal device 50 other than the target by a beam selected in a certain base station device 30. Thus, it is possible to contribute to improvement of the performance of the entire system.

In other words, the training data set includes the BSM, and the determination units 342 and 552 cause the beamforming index to be selected on the basis of a learning result of the machine learning using the BSM in which the SLR is used as an index of the interference to what is other than the target in the ML-based mode.

Figure 37:
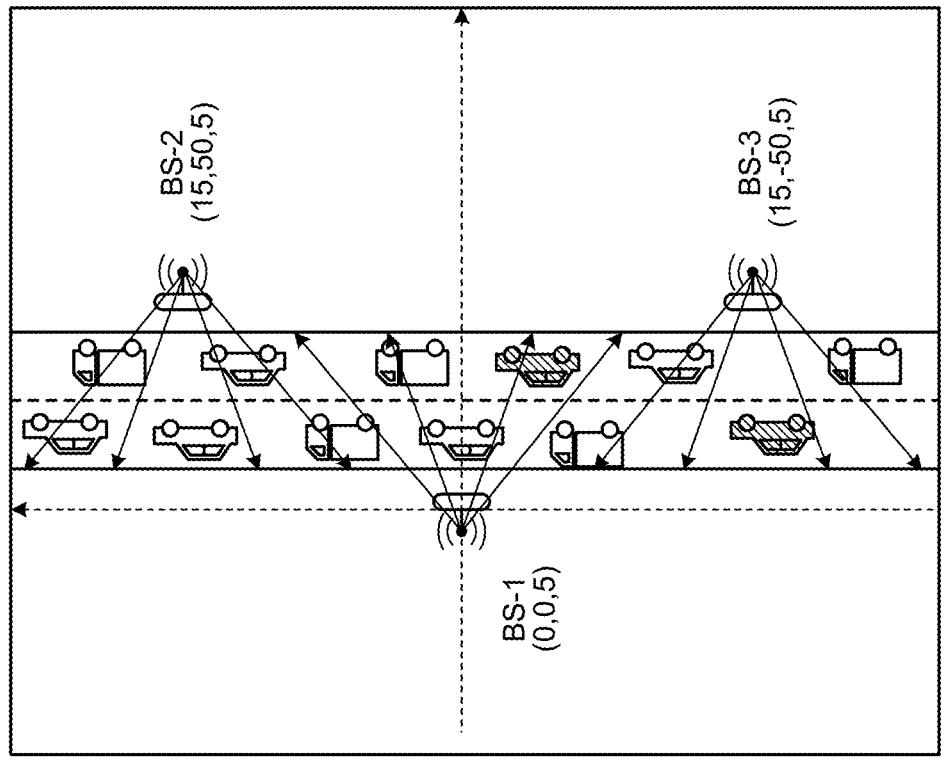
FIG. 37 is a view illustrating a simulation model for verification of a second example.
Figure 38:
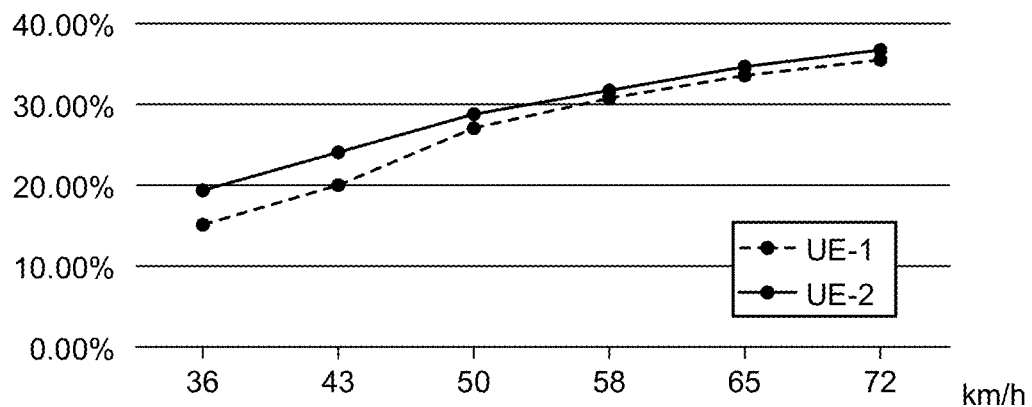
FIG. 38 is a view illustrating a verification result of a base station level according to the second example.
Figure 39:
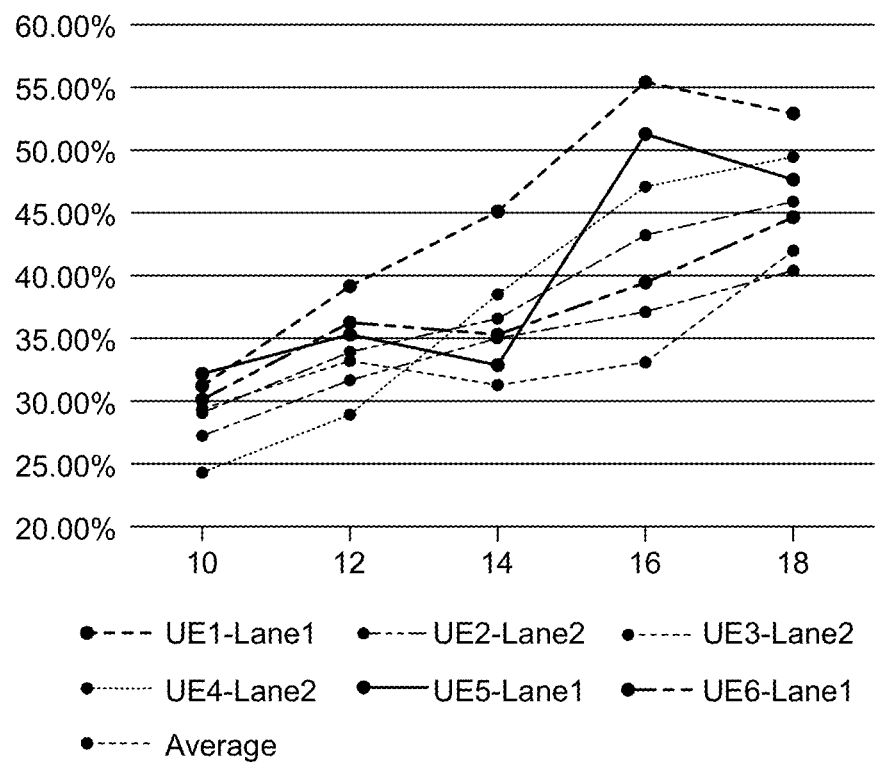
FIG. 39 is a view illustrating a verification result of a system level according to the second example.
Figure 40:
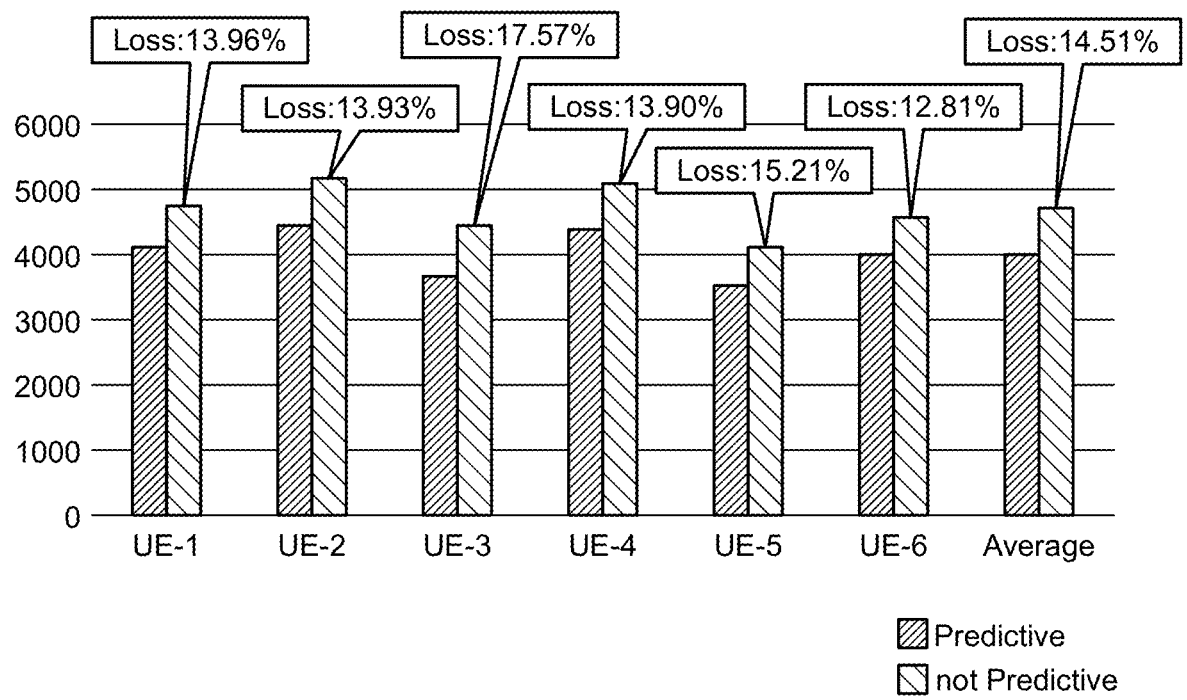
FIG. 40 is a view illustrating a throughput loss of each UE.

For reference, a simulation model for verification of the second example is illustrated in FIG. 37. FIG. 37 is a view illustrating the simulation model for verification of the second example. In addition, verification results according to the second example are illustrated in FIG. 38 to FIG. 40. FIG. 38 is a view illustrating a verification result of a base station level according to the second example. Furthermore, FIG. 39 is a view illustrating a verification result of a system level according to the second example. Furthermore, FIG. 40 is a view illustrating a throughput loss for each UE.

In the verification result, when FIG. 40 is focused on, it can be understood that a throughput loss is lower in the ML-based predictive interference management (corresponding to "Predictive" in the drawing) than that of what is not the ML basis (corresponding to "not Predictive" in the drawing), and that improvement in performance can be seen.

5. MODIFICATION EXAMPLE

The above-described embodiments are examples, and various modifications and applications are possible.

5-1. Modification Example Related to Machine Learning

For example, learning of mode switching determination may be performed by utilization of the above-described verification result of communication. For example, the base station device 30 and/or the terminal device 50 acquires a learning result by performing machine learning on known data, a mode switching determination result based on the data, and a correlation of a communication result based on the determination result.

Such a learning result is, for example, a learning model that outputs a mode predicted to give an optimal communication result in a case where data related to a current state is input. The base station device 30 and/or the terminal device 50 can select the optimal mode corresponding to the current state by executing the mode switching determination by using the learning model.

Furthermore, the learning model may be updated by verification of the communication result and repetition of additional learning based on the verification result. This makes it possible to improve determination accuracy of the mode switching determination.

Furthermore, for example, the base station device 30 and the terminal device 50 may individually have learning models, and individually perform additional learning on the basis of verification results of communication respectively. As a result, it is possible to improve determination accuracy of the learning models while absorbing an error between the devices.

5-2. Other Modification Example

A control device that controls a management device 10, a base station device 20, a base station device 30, or a terminal device 50 of the present embodiment may be realized by a dedicated computer system or a general-purpose computer system.

For example, a program for executing the above-described operation is stored in a computer-readable recording medium such as an optical disk, a semiconductor memory, a magnetic tape, or a flexible disk and distributed. Then, for example, the program is installed in a computer and the above-described processing is executed, whereby the control device is configured. At this time, the control device may be a device (such as personal computer) outside the management device 10, the base station device 20, the base station device 30, or the terminal device 50. Furthermore, the control device may be a device inside the management device 10, the base station device 20, the base station device 30, or the terminal device 50 (such as control unit 13, control unit 24, control unit 34, or control unit 55).

Furthermore, the communication program may be stored in a disk device included in a server device on a network such as the Internet in such a manner as to be downloadable to a computer. In addition, the above-described functions may be realized by cooperation of an operating system (OS) and application software. In this case, a portion other than the OS may be stored in a medium and distributed, or the portion other than the OS may be stored in a server device and downloaded to a computer.

Also, among the pieces of processing described in the above embodiments, all or a part of the processing described to be automatically performed can be manually performed, or all or a part of the processing described to be manually performed can be automatically performed by a known method. In addition, the processing procedures, specific names, and information including various kinds of data or parameters illustrated in the above document or in the drawings can be arbitrarily changed unless otherwise specified. For example, various kinds of information illustrated in each drawing are not limited to the illustrated information.

Also, each component of each of the illustrated devices is a functional concept, and does not need to be physically configured in a manner illustrated in the drawings. That is, a specific form of distribution/integration of each device is not limited to what is illustrated in the drawings, and a whole or part thereof can be functionally or physically distributed/integrated in an arbitrary unit according to various loads and usage conditions.

In addition, the above-described embodiments can be arbitrarily combined in a region in which the processing contents do not contradict each other. Furthermore, the order of steps illustrated in the sequence diagram or the flowchart of the present embodiment can be changed as appropriate.

6. CONCLUSION

As described above, according to an embodiment of the present disclosure, an information processing device (such as terminal device 50 or base station device 30) acquires information related to a communication environment, and determines a mode to be used on the basis of the information related to the communication environment among a first mode of determining a communication parameter on the basis of a measurement result using a reference signal (such as reference signal) (such as Measurement-based mode), a second mode of determining a communication parameter on the basis of a learning result of machine learning using known information related to communication (such as ML-based mode), and a third mode of determining a communication parameter according to the first mode and/or the second mode (such as Hybrid mode). As a result, an overhead in wireless communication can be reduced.

Although embodiments of the present disclosure have been described above, the technical scope of the present disclosure is not limited to the above-described embodiments as they are, and various modifications can be made within the spirit and scope of the present disclosure. Also, components of different embodiments and modification examples may be arbitrarily combined.

Also, an effect in each of the embodiments described in the present description is merely an example and is not a limitation, and there may be a different effect.

Note that the present technology can also have the following configurations.

(1)

An information processing device comprising:

an acquisition unit that acquires information related to a communication environment, and a determination unit that determines a mode to be used on a basis of the information related to the communication environment among a first mode of determining a communication parameter on a basis of a measurement result using a reference signal, a second mode of determining the communication parameter on a basis of a learning result of machine learning using known information related to communication, and a third mode of determining the communication parameter according to the first mode and/or the second mode.

(2)

The information processing device according to (1), wherein the determination unit determines to use at least the second mode in a case where it is determined that a fluctuation state of communication is easily predicted on the basis of the information related to the communication environment.

(3)
The information processing device according to (2), wherein
the information related to the communication environment includes positional information related to a current position and/or a 3D map, and
the determination unit
determines whether the fluctuation state is easily predicted on a basis of the positional information and/or the 3D map.

(4)
The information processing device according to any one of (1) to (3), wherein
the information related to the communication environment includes information related to predetermined surrounding areas, and
the determination unit
determines whether to use the second mode on a basis of a selection probability of beamforming of a case where the second mode is used, the selection probability being associated with each of the areas.

(5)
The information processing device according to any one of (1) to (4), wherein
the information related to the communication environment includes an overhead rate of communication, and
the determination unit
determines to use at least the second mode in a case where it is determined that there are many overheads on a basis of the overhead rate.

(6)
The information processing device according to any one of (1) to (5), wherein
the information related to the communication environment includes information indicating a degree of importance of communication, and
the determination unit
at least determines to use not only the second mode in a case where the degree of importance is determined to be high.

(7)
The information processing device according to any one of (1) to (6), wherein
the information related to the communication environment includes information indicating magnitude of disturbance, and
the determination unit
at least determines to use not only the second mode in a case where it is determined that the disturbance is large.

(8)
The information processing device according to any one of (1) to (7), wherein
the known information related to communication includes a beam strength map (BSM), and
the determination unit
causes a beamforming index to be selected on a basis of the learning result of the machine learning using the BSM in which a signal to leakage ratio (SLR) is used as an index of interference to what is other than a target in the second mode.

(9)
The information processing device according to any one of (1) to (8), wherein
the determination unit
causes, in a case where a link or beam is lost in one of the first mode and the second mode, a fallback in the other mode to be performed in the third mode.

(10)
The information processing device according to any one of (1) to (9), wherein
the determination unit
causes the first mode to be used in an interval of the second mode that is used basically, and switches the second mode to the first mode when a degree of deviation in communication quality of the two exceeds a predetermined threshold in the third mode.

(11)
An information processing method comprising:
acquiring information related to a communication environment, and
determining a mode to be used on a basis of the information related to the communication environment among a first mode of determining a communication parameter on a basis of a measurement result using a reference signal, a second mode of determining the communication parameter on a basis of a learning result of machine learning using known information related to communication, and a third mode of determining the communication parameter according to the first mode and/or the second mode.

(12)
A terminal device comprising:
an acquisition unit that acquires information related to a communication environment, and
a determination unit that determines a mode to be used on a basis of the information related to the communication environment among a first mode of determining a communication parameter on a basis of a measurement result using a reference signal from a base station device, a second mode of determining the communication parameter on a basis of a learning result of machine learning using known information related to communication, and a third mode of determining the communication parameter according to the first mode and/or the second mode.

(13)
A base station device comprising:
an acquisition unit that acquires information related to a communication environment from a terminal device, and
a determination unit that determines a mode to be used on a basis of the information related to the communication environment among a first mode of determining a communication parameter on a basis of a measurement result using a reference signal, a second mode of determining the communication parameter on a basis of a learning result of machine learning using known information related to communication, and a third mode of determining the communication parameter according to the first mode and/or the second mode.

(14)
A program causing a computer included in a terminal device to function as
an acquisition unit that acquires information related to a communication environment, and
a determination unit that determines a mode to be used on a basis of the information related to the communication environment among a first mode of determining a communication parameter on a basis of a measurement result using a reference signal from a base station device, a second mode of determining the communication parameter on a basis of a learning result of machine learning using known information related to communication, and a third mode of determining the communication parameter according to the first mode and/or the second mode.

(15) A program causing a computer included in a base station device to function as
an acquisition unit that acquires information related to a communication environment from a terminal device, and
a determination unit that determines a mode to be used on a basis of the information related to the communication environment among a first mode of determining a communication parameter on a basis of a measurement result using a reference signal, a second mode of determining the communication parameter on a basis of a learning result of machine learning using known information related to communication, and a third mode of determining the communication parameter according to the first mode and/or the second mode.

REFERENCE SIGNS LIST

1 INFORMATION PROCESSING SYSTEM
10 MANAGEMENT DEVICE
20, 30 BASE STATION DEVICE
50 TERMINAL DEVICE
11, 23, 33, 53 NETWORK COMMUNICATION UNIT
12, 22, 32, 52 STORAGE UNIT
13, 24, 34, 55 CONTROL UNIT
21, 31, 51 WIRELESS COMMUNICATION UNIT
54 INPUT/OUTPUT UNIT
131 COLLECTION UNIT
132 LEARNING UNIT
133 NOTIFICATION UNIT
134 COMMUNICATION CONTROL UNIT
211, 311, 511 RECEPTION PROCESSING UNIT
212, 312, 512 TRANSMISSION PROCESSING UNIT
213, 313, 513 ANTENNA
241, 341, 551 ACQUISITION UNIT
242, 342, 552 DETERMINATION UNIT
243, 343, 553 SETTING UNIT
244, 344, 554 NOTIFICATION UNIT
245, 345, 555 COMMUNICATION CONTROL UNIT

The invention claimed is:

1. An communication device comprising:
a transceiver; and
processing circuitry that:
acquires information related to a communication environment,
wherein the information related to a communication environment comprises at least one parameter from each of a first through fourth information category, the first information category comprising information related to a terminal, the second information category comprising information related to a base station, the third information category comprising information related to a communication band, and the fourth information category comprising other information,
wherein the information related to the terminal of the first information category comprises positional information related to a current position of the terminal, and
wherein the information related to the base station of the second information category comprises positional information related to a position of the base station, and
selects, from a predetermined set of modes, a mode to be used on a basis of the information related to the communication environment,
wherein the predetermined set of modes consists of:
a first mode of determining a communication parameter only on a basis of a measurement result using a reference signal and without consideration of the current position of the terminal and the position of the base station,
a second mode of determining the communication parameter only on a basis of a learning result of machine learning using known information related to the communication environment and without consideration of the current position of the terminal and the position of the base station, and
a third mode for determining the communication parameter, the third mode being one of the first mode or the second mode that is selected based on the current position of the terminal and the position of the base station, and
communicates with a plurality of other communication devices in accordance with the communication parameter that is determined in accordance with the selected mode.

2. The communication device according to claim 1, wherein the processing circuitry determines to use the second mode in the third mode in a case where it is determined that a fluctuation state of the communication environment can be predicted by the machine learning on the basis of the information related to the communication environment.

3. The communication device according to claim 2, wherein
the other information includes information on a 3D map, and
the processing circuitry determines whether the fluctuation state can be predicted by the machine learning on a basis of the current position of the terminal and the 3D map.

4. The communication device according to claim 1, wherein
the information related to the communication band includes information indicating a degree of importance of communication, and
the processing circuitry at least determines to use the first mode in the third mode in a case where the degree of importance is determined to be above a predetermined importance threshold.

5. The communication device according to claim 1, wherein
the information related to the communication band includes information indicating magnitude of disturbance, and
the processing circuitry at least determines to use the first mode in the third mode in a case where it is determined that the disturbance is above a predetermined disturbance threshold.

6. The communication device according to claim 1, wherein the processing circuitry causes, in a case where a link or beam is lost in one of the first mode or the second mode, a shift from the one of the first mode or the second mode to the third mode.

7. The communication device according to claim 1, wherein, in the third mode, the processing circuitry selects the second mode upon determining that a variation of a propagation characteristic of the communication environment is predictable.

8. The communication device according to claim 7, wherein the processing circuitry determines that the variation of the propagation characteristic of the communication environment is predictable based on the current position of the terminal and based on historic communication quality information related to the current position of the terminal.

9. The communication device according to claim 1, wherein, in the third mode, the processing circuitry selects the one of the first mode or the second mode based on area information related to the current position of the terminal.

10. The communication device according to claim 1, wherein, in the third mode, the processing circuitry selects the one of the first mode or the second mode based on a priority of information to be communicated with the plurality of other communication devices.

11. The communication device according to claim 1, wherein, in the third mode, the processing circuitry selects the first mode based on an interference level at the current position of the terminal exceeding a predetermined threshold.

12. The communication device according to claim 1, wherein, in the third mode, after selecting the one of the first mode or the second mode, the processing circuitry selects the other of the first mode or the second mode upon detecting a link or beam loss in the selected one of the first mode or the second mode.

13. The communication device according to claim 1, wherein, in the third mode, after selecting the second mode, the processing circuitry switches to the first mode based on a deviation in communication quality in at least one of the first and second modes exceeding a predetermined threshold.

14. A communication method performed by a communication device and comprising:
   acquiring information related to a communication environment,
   wherein the information related to a communication environment comprises at least one parameter from each of a first through fourth information category, the first information category comprising information related to a terminal, the second information category comprising information related to a base station, the third information category comprising information related to a communication band, and the fourth information category comprising other information,
   wherein the information related to the terminal of the first information category comprises positional information related to a current position of the terminal, and
   wherein the information related to the base station of the second information category comprises positional information related to a position of the base station; and
   selecting, from a predetermined set of modes, a mode to be used on a basis of the information related to the communication environment,
   wherein the predetermined set of modes consists of:
   a first mode of determining a communication parameter only on a basis of a measurement result using a reference signal and without consideration of the current position of the terminal and the position of the base station,
   a second mode of determining the communication parameter only on a basis of a learning result of machine learning using known information related to the communication environment and without consideration of the current position of the terminal and the position of the base station, and
   a third mode for determining the communication parameter, the third mode being one of the first mode or the second mode that is selected based on the current position of the terminal and the position of the base station; and
   communicating with a plurality of other communication devices in accordance with the communication parameter that is determined in accordance with the selected mode.

15. The communication device according to claim 14, wherein the processing circuitry determines to use the second mode in the third mode in a case where it is determined that a fluctuation state of the communication environment can be predicted by the machine learning on the basis of the information related to the communication environment.

16. The communication device according to claim 14, wherein
   the other information includes information on a 3D map, and
   the processing circuitry determines whether the fluctuation state can be predicted by the machine learning on a basis of the current position of the terminal and the 3D map.

17. A non-transitory computer product containing a program causing a computer included in a communication device to function as
   processing circuitry that:
   acquires information related to a communication environment,
   wherein the information related to a communication environment comprises at least one parameter from each of a first through fourth information category, the first information category comprising information related to a terminal, the second information category comprising information related to a base station, the third information category comprising information related to a communication band, and the fourth information category comprising other information,
   wherein the information related to the terminal of the first information category comprises positional information related to a current position of the terminal, and
   wherein the information related to the base station of the second information category comprises positional information related to a position of the base station, and
   selects, from a predetermined set of modes, a mode to be used on a basis of the information related to the communication environment,
   wherein the predetermined set of modes consists of:
   a first mode of determining a communication parameter only on a basis of a measurement result using a reference signal from a base station device and without consideration of the current position of the terminal and the position of the base station,
   a second mode of determining the communication parameter only on a basis of a learning result of machine learning using known information related to the communication environment and without consideration of the current position of the terminal and the position of the base station, and
   a third mode for determining the communication parameter, the third mode being one of the first mode or the second mode that is selected based on the current position of the terminal and the position of the base station; and
   communicates with a plurality of other communication devices in accordance with the communication parameter that is determined in accordance with the selected mode.

18. The non-transitory computer product according to claim 17, wherein the processing circuitry determines to use the second mode in the third mode in a case where it is determined that a fluctuation state of the communication environment can be predicted by the machine learning on the basis of the information related to the communication environment.

19. The non-transitory computer product according to claim 17, wherein
- the other information includes information on a 3D map, and
- the processing circuitry determines whether the fluctuation state can be predicted by the machine learning on a basis of the current position of the terminal and the 3D map.

* * * * *